US012587808B2

(12) United States Patent  (10) Patent No.: US 12,587,808 B2
Robstad et al.  (45) Date of Patent: Mar. 24, 2026

(54) DEVICE LOCATIONS USING MACHINE LEARNING

(71) Applicant: Nordic Semiconductor ASA, Trondheim (NO)

(72) Inventors: Erik Vincent Røgenes Robstad, Trondheim (NO); Carsten Wulff, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 227 days.

(21) Appl. No.: 18/290,276

(22) PCT Filed: May 11, 2022

(86) PCT No.: PCT/EP2022/062838
§ 371 (c)(1),
(2) Date: Nov. 10, 2023

(87) PCT Pub. No.: WO2022/238508
PCT Pub. Date: Nov. 17, 2022

(65) Prior Publication Data
US 2024/0244395 A1 Jul. 18, 2024

(30) Foreign Application Priority Data
May 12, 2021 (GB) ...................................... 2106732

(51) Int. Cl.
*H04W 4/02* (2018.01)
*G06N 20/00* (2019.01)
(52) U.S. Cl.
CPC ............ *H04W 4/023* (2013.01); *G06N 20/00* (2019.01)

(58) Field of Classification Search
None
See application file for complete search history.

(56) References Cited

U.S. PATENT DOCUMENTS 10,742,959 B1 8/2020 Mihal et al.
10,861,465 B1 12/2020 Vines et al.
(Continued)

FOREIGN PATENT DOCUMENTS

WO WO 2017/058010 A1 4/2017
WO WO 2018/176000 A1 9/2018
WO WO 2020/040779 A1 2/2020

OTHER PUBLICATIONS

Bui et al., "A Localization Algorithm with Learning-based Distances," *14th International Conference on Computer Communications and Networks*, Oct. 2005, 6 pages.
(Continued)

*Primary Examiner* — Mazda Sabouri

(74) *Attorney, Agent, or Firm* — Klarquist Sparkman, LLP

(57) ABSTRACT

A method of determining device locations includes receiving a set of candidate locations in an environment and generating training data representing synthetic distance measurements between pairs of the candidate locations. The synthetic distance measurements are generated by applying random variations to the geometric distances between the candidate locations. The training data and candidate locations are used to train a machine learning model. A set of measured distances between devices are input to the trained learning model, which is used to determine a respective location in the environment of each of the devices.

20 Claims, 12 Drawing Sheets

(56) References Cited

U.S. PATENT DOCUMENTS

| | | | | |
|---|---|---|---|---|
| 10,909,335 | B2 * | 2/2021 | Lee | G06K 7/10099 |
| 2010/0127933 | A1 * | 5/2010 | Kuo | G01S 5/0205 |
| | | | | 342/386 |
| 2010/0164781 | A1 * | 7/2010 | Boyer | G01S 5/06 |
| | | | | 342/165 |
| 2021/0012180 | A1 * | 1/2021 | Saadallah | G06N 3/09 |

OTHER PUBLICATIONS

IPO Combined Search and Examination Report under Sections 17 and 18(3) for GB2106732.7, mailed Nov. 9, 2021.
International Search Report and Written Opinion for PCT/EP2022/062838, mailed Sep. 1, 2022, 15 pages.
Nerguizian et al., "Indoor Geolocation with Received Signal Strength Fingerprinting Technique and Neural Networks," *International Conference on Telecommunications*, Aug. 2004, pp. 866-875.
Rahman et al., Localization of Wireless Sensor Network Using Artificial Neural Network, *9th International Symposium on Communications and Information Technology*, Sep. 2009, pp. 639-642.

* cited by examiner

S100    Receive candidate location data

S101    Calculate geometric distances

S102    Simulate radio range

S103    Simulate measurement error

S104    Train model

S105    Receive measurement data

S106    Input measurement data to model

S107    Determine device locations

DEVICE LOCATIONS USING MACHINE LEARNING

CROSS REFERENCE TO RELATED APPLICATIONS

This is the U.S. National Stage of International Application No. PCT/EP2022/062838, filed May 11, 2022, which was published in English under PCT Article 21 (2), which in turn claims the benefit of Great Britain Application No. 2106732.7, filed May 12, 2021.

BACKGROUND OF THE INVENTION

The present invention relates to methods, software and apparatus for determining locations of devices using machine learning.

The so-called "Internet of Things" (IoT) is the common name for the inter-networking of physical devices, sometimes called "smart devices", which provides physical objects with the ability to communicate with other physical and/or virtual objects. Such smart devices include vehicles, household appliances, lighting and heating (e.g. for home automation) and medical devices. These smart devices are typically real-world objects with embedded electronics, software, sensors, actuators, and network connectivity, thus allowing them to collect, share, and act upon data. These devices may communicate with user devices (e.g. interfacing with a user's smartphone) and/or with other smart devices. Such devices often support wireless communication, with network connectivity being provided by radio links to other smart devices and/or to a wireless hub (e.g. with a mesh network topology), such as over Bluetooth or IEEE 802.5.14 links.

Smart devices such as light fittings, light bulbs, switches, thermostats and speakers are increasingly being installed in buildings for domestic, professional and industrial purposes. Although some smart devices are designed to be installed by the end-user, it is often the case that a network of a number of smart devices will be installed by a professional electrician, e.g. during construction, renovation or maintenance of a property.

In order for a network of smart devices to be useful, it is often helpful for the respective location of each device to be known. For example, in a building containing a number of wireless-networked light bulbs, a user may wish to turn on only one light bulb, corresponding to a particular room, using a particular wireless-networked switch. In this case, if the device locations are not available to be provided to the installer, it will be necessary for the installer to identify the desired device manually, e.g. by turning on all of the bulbs in the building one by one and establishing their respective locations, which could be very time-consuming.

In addition, during installation of a network of smart devices, it is often impracticable to record the location of each device manually, as this requires recording both a unique device identifier (e.g. a MAC address or a serial number) as well as the corresponding location for each device, e.g. on a paper map or in a computer database. As smart device networks can comprise hundreds of devices or more, it will be appreciated that this manual approach can quickly become unacceptably time-consuming and inefficient.

The present invention seeks to provide an improved approach for determining the locations of devices.

SUMMARY OF THE INVENTION

From a first aspect the invention provides a method of determining locations of devices, the method comprising:

receiving location data representative of a set of candidate locations in an environment;

generating training data comprising a plurality of training data sets, each training data set comprising data representing synthetic distance measurements between respective pairs of the candidate locations, wherein the synthetic distance measurements are determined by determining geometric distances between pairs of the candidate locations and applying random variations to the geometric distances;

using the training data and the location data to train a machine learning model that is arranged to receive a set of distance measurements as input and to generate data representative of a set of one or more locations as output;

receiving measurement data representative of a set of measured distance measurements between respective pairs of a plurality of devices in the environment;

inputting the set of measured distance measurements to the trained machine learning model; and determining, from the trained machine learning model, data representative of a respective location in the environment for each of the plurality of devices.

From a second aspect the invention provides apparatus comprising a computer processing system for determining locations of devices, the computer processing system being configured to:

access location data representative of a set of candidate locations in an environment;

generate training data comprising a plurality of training data sets, each training data set comprising data representing synthetic distance measurements between respective pairs of the candidate locations, wherein the synthetic distance measurements are determined by determining geometric distances between pairs of the candidate locations and applying random variations to the geometric distances;

use the training data and the location data to train a machine learning model that is arranged to receive a set of distance measurements as input and to generate data representative of a set of one or more locations as output;

receive measurement data representative of a set of measured distance measurements between respective pairs of a plurality of devices in the environment;

input the set of measured distance measurements to the trained machine learning model; and determine, from the trained machine learning model, data representative of a respective location in the environment for each of the plurality of devices.

From a third aspect the invention provides computer software for determining locations of devices, the computer software being suitable for execution by a processor and comprising instructions that, when executed by the processor, cause the processor to:

access location data representative of a set of candidate locations;

generate training data comprising a plurality of training data sets, each training data set comprising data representing synthetic distance measurements between respective pairs of the candidate locations, wherein the synthetic distance measurements are determined by determining geometric distances between pairs of the candidate locations and applying random variations to the geometric distances;

use the training data and the location data to train a machine learning model that is arranged to receive a set of distance measurements as input and to generate data representative of a set of one or more locations as output;

receive measurement data representative of a set of measured distance measurements between respective pairs of a plurality of devices in the environment;

input the set of measured distance measurements to the trained machine learning model; and determine, from the trained machine learning model, data representative of a respective location in the environment for each of the plurality of devices.

Thus it will be appreciated that embodiments of the present invention provide methods for determining, from distance measurements between devices, a respective location of each device when a set of candidate locations is known. Such methods may usefully be employed to map the devices to different respective locations in situations where the intended or actual locations of the devices are known, but where it is not known which of the devices is located at which location. The approach involves using synthetic training data, representative of distances between the devices, to train a machine learning model to generate location data for each of the devices.

By using random variations to generate multiple sets of synthetic (i.e. synthesized or simulated) distance measurements between the candidate locations, the model can be trained to be robust to error (e.g. noise) in measured distance measurements between the actual devices.

At least in some embodiments, the model may be trained for one-time use and then discarded. Training a model specifically with a particular set of locations, rather than training a more general model for repeated use across many different environments, has been found to facilitate particularly efficient training and also particularly accurate positioning.

This approach has many potential applications. To give one example, it may allow a maintenance engineer to install wireless-networked lightbulbs into a set of light fittings (luminaires) throughout a building, without having to keep track of which bulb has been put into which fitting. The installer can instead provide software, embodying the invention, with the locations of the light fittings (but not the bulbs), e.g. as coordinates taken from a building blueprint, either before or after the installation. After installation, the lightbulbs can be instructed to perform a radio ranging process to measure the pairwise separation distances between bulbs that are in radio range of each other. The resulting measurement data can be input to the software, which uses it to determine respective locations for the individual bulbs. It may output this information in any appropriate way—e.g. by displaying a plan of the installed light bulbs with a MAC address of the bulb displayed on the plan.

Preferably, the number of devices in the plurality of devices is the same as the number of candidate locations in the set of candidate locations.

The devices may comprise wireless network interfaces. They may comprise radio transceivers, such as Bluetooth Low Energy radio transceivers. They may be configured for communication with each other, e.g. as a mesh network. The computer processing system may comprise a server or workstation, which may comprise a network interface for receiving data (e.g. measurement data) from one or more of the plurality of devices. In some embodiments, the apparatus may comprise said plurality of devices. The computer processing system may be arranged to generate the measurement data, e.g. from signal-timing or signal-phase data received from one or more devices.

The measurement data may be generated manually. However, in preferred embodiments the measurement data is generated at least in part by one or more of the plurality of devices. The measurement data may be generated from radio signals exchanged between pairs of the devices, e.g. as part of a radio distance ranging process. The measurement data may be generated by the devices using phase-based ranging or timing-based ranging. The measurement data may be generated using time-of-flight, interferometry, signal-to-noise ratio (SNR), Received Signal Strength Indicator (RSSI) techniques etc. The measurement data may be generated using laser telemetry. Radio ranging techniques can be advantageous as they do not require a visual line-of-sight between the pair of devices.

The measurement data may be communicated between the plurality of devices, e.g. through a (e.g. Bluetooth Low Energy) mesh network. Receiving measurement data may comprise receiving measurement data communicated in a measurement data signal. The measurement data signal may be a radio signal. It may be an electrical signal.

The computer processing system may be configured to instruct a device of the plurality of devices to generate measurement data representative of a distance between said device and another of the devices. The computer processing system may instruct each, or a subset, of the devices individually (e.g. in a sequence).

In some embodiments, the devices are "Internet of Things" (IoT) devices. In some embodiments, the devices are configured to perform radio distance ranging in order to generate the measurement data. The devices may comprise (e.g. 2.4 GHz) transceivers. This allows ranging techniques operating in the 2.4 GHz band to be used inexpensively. The devices may support any current or future radio-ranging standard. They may support any current or future Bluetooth or Bluetooth Low Energy specification. The plurality of devices may comprise smart sockets, smart lights, smart thermostats, smart speakers etc., or any other suitable smart device.

In preferred embodiments, each of the plurality of devices has a respective device-specific (i.e. unique at least within the system) identifier (e.g. a MAC address, an (e.g. static) IP address, serial number or device ID). The system may use this to identify a particular device from the plurality of devices—i.e. to distinguish between the devices. The measurement data may comprise data representative of each device identifier. In some embodiments, the measurement data comprises data representative of the corresponding device identifiers for each respective pair of devices. This means that each of the respective locations determined by the model is associated with a single device-specific identifier, allowing the location of particular device to be determined.

In some embodiments, the location data representative of a set of candidate locations comprises two-dimensional (2D) (e.g. x,y) or three-dimensional 3D (e.g. x,y,z) coordinates for the respective locations. The candidate locations may represent approximate locations. For example, a candidate location may correspond generally to a room or workstation in a building in which a device may be located. However, in some embodiments, the candidate locations represent accurate device locations. In this case, an area designated by a candidate location may be smaller than the size of a corresponding device. This may allow the location of the corresponding device to be more precisely determined.

In some embodiments, each of the candidate locations corresponds (e.g. in a one-to-one relationship) to an intended or current location of a respective one of the plurality of devices in the environment (i.e. a "real-world" location).

In some embodiments, the location data representative of the set of candidate locations does not identify the plurality of devices. It will be appreciated that embodiments of the present invention do not require any true device locations to be known in advance (e.g. by providing static anchor nodes of known location) in order to determine the respective locations of the devices. This contrasts with conventional positioning methods such as trilateration, for which, in order to calculate the position of a target node, the particular locations of at least three other nodes must be known, as well as the respective distances from a target node to each of the three "known" nodes.

The environment for the candidate locations and the plurality of devices may be a building, a room within a building, an outdoor space or any other suitable environment.

The geometric distances between pairs of candidate locations may be determined in any suitable or desired way. They could be received as input to the computer processing system (e.g. being calculated or measured by a human user). However, in preferred embodiments, they are calculated from the candidate locations by the computer processing system. This may be done in any of various ways, such as using an algorithm based on Pythagoras' theorem. The geometric distances may be straight-line distances between the pairs of locations. The data representing synthetic distance measurements may comprise data representing synthetic distance measurements between all pairs of the candidate device locations.

Because the training data for the model is calculated from the set of candidate locations, there can be a high likelihood of the training data being very similar to the measurement data input to the model during the inference stage, assuming the candidate locations accurately approximate or correspond to the true device locations. This approach contrasts with more traditional machine learning training methods, in which models may be trained on a wide variety of different training data so that a model need only be trained once for use in many different contexts, rather than training a model uniquely for each implementation. However, the Applicant has appreciated that, by simulating closely the data that will be input to the model during the inference stage, the accuracy of the locations output by the model can be improved.

Synthesizing multiple sets of training distances, using random variations, can allow the model to learn to cope with any noise that may be present in the measured distance measurements, e.g. obtained using radio ranging between pairs of the actual devices. In some embodiments, the random variations are drawn from a statistical distribution (such as a uniform, normal or Gaussian distribution) which may be representative of measurement uncertainty (e.g. inaccuracy in the distance measurements and/or imprecise candidate locations). Training the model on a plurality of synthetic training sets representative of a range of expected error in the measurement data can enable the model to become robust to such variations if they are present in the actual received measurement data.

Applying random variations to the calculated geometric distances may comprise excluding one or more geometric distances from being used to generate the training data, based on a random variable (e.g. based on a set of first random numbers, as described below). Applying random variations may alternatively or additionally comprise adjusting the value of one or more geometric distances based on a random variable (e.g. based on a set of second random numbers, as described below), In some embodiments, generating a training data set comprises determining, for each of the geometric distances, a respective first random number. A respective set of first random numbers may be generated for each of the training data sets. Each first random number may represent a simulated distance measuring limit between the pair of candidate locations corresponding to the geometric distance—i.e. for a respective pair of devices at those locations. It may represent a maximum distance that the devices can reliably measure. When the devices are radio devices, each first random number may represent or depend on a simulated radio range. Unknown or variable conditions in the environment may cause the maximum range over which distances can be reliably determined, between pairs of locations, to be uncertain or to vary over time. Thus each first random number may be drawn from a respective statistical distribution which may be representative of a randomly-varying maximum distance-measurement threshold for the pair of candidate locations. In some embodiments, all of the first random numbers, across all of the geometric distances and across all of the training data sets, may be drawn from a common statistical distribution. This is not essential, but may simplify the implementation.

Preferably, the units of the first random numbers are the same as the units of the distance geometric distance values (e.g. with both representing distances in millimetres). Each first random number may be compared with the respective geometric distance. In some embodiments the method comprises comparing each first random number with the respective geometric distance value and determining when the geometric distance value is greater than (or is greater than or equal to) the respective first random number. The method may comprise using a geometric distance for generating the training data in dependence on whether or not the geometric distance value is greater than (or is greater than or equal to) the respective first random number. A geometric distance may be excluded from the training data (e.g. by setting it to zero) if it is greater than (or is greater than or equal to) the respective first random number. It may be included when it is less than (which may include less than or equal to) the random number. It may be the case that the plurality of devices are located within the environment such that one or more of the devices is out of measurement range of one or more other devices. In this case, when the plurality of devices are configured to generate the measurement data, e.g. using ranging techniques, it may not be possible for all pairwise distances between the devices to be measured. It will be appreciated that, when a corresponding geometric distance for a pair of candidate locations is greater than the respective first random number, a pair of devices at or near those locations, and separated by said distance, are simulated as being outside measurement range of each other, when generating the training data. Excluding such a pair of locations from one or more of the training data sets (e.g. by setting the distance value to zero) can simulate a scenario in which the distance between a pair of devices at those locations cannot be determined by the ranging method. By applying this filtering to the training data used to train the machine learning model, the training data can be made to simulate more closely the measured measurement data that will be received by the model during the inference stage.

In some embodiments, generating a training data set comprises determining a respective second random number for each of the geometric distances (which may be each of the geometric distances that has not been excluded after a comparison with the first random number). A respective set of second random numbers may be generated for each of the training data sets. Each second random number may represent an error term for the geometric distance. It may represent a simulated measurement error in the measured distance between a pair of devices located at or near the corresponding pair of candidate locations separated by the geometric distance. Each second random number may be drawn from a respective statistical distribution (e.g. a uniform or Gaussian distribution) which may be representative of a randomly-varying error in the set of measured distance measurements. In some embodiments, all of the second random numbers, across all of the geometric distances and across all of the training data sets, may be drawn from a common statistical distribution. This is not essential, but may simplify the implementation.

Each geometric distance may be modified in dependence on the respective second random number. In some embodiments, the units of the second random numbers are the same as the units of the distance geometric distance values, and each second random number is added to the respective geometric distance. The sets of second random numbers may include positive numbers and negative numbers.

It will be appreciated that the terms "first" and "second" are merely labels to aid understanding of the embodiments. These do not necessarily imply a particular sequence or co-dependence and the terms may be interchanged as appropriate.

The training data may comprise any number of training data sets—e.g. ten, a hundred, a thousand or more. Each training data set may be used in one or more iterations and/or epochs of training of the model. In some embodiments, a plurality of training data sets may be combined to create a single (larger) dataset of input distances, for inputting to the model. The combined dataset may be used, with the location data (which may duplicated for each subset of training data and included within the combined dataset), as input for one or more epochs of training of the model.

The method may further comprise normalising the training data and/or the location data. The synthetic distance measurements and/or measured distance measurements may be normalised to lie within a standard interval (e.g. between −1 and 1 or between 0 and 1). This may help to improve the synergy between the model inputs and the internal weights of the model. It may also reduce the likelihood of a computer processor encountering numerical overflow issues.

The machine learning model may be a classification model. However, in some preferred embodiments, the machine learning model is a regression model. Using a machine learning model may enable complex patterns and connections that can be difficult for humans to comprehend to be discovered. The model may be trained using a loss function that is a function of the received location data and the location data generated by the model. The loss function may be a Mean Absolute Error (mae) loss function. In some embodiments, the machine learning model comprises a neural network. The machine learning model may comprise a deep learning neural network (i.e. a neural network comprising more than three layers).

Computer software embodiment the invention may comprise instructions for implementing the machine learning model. It may further comprise instructions implementing a training routine for training the machine learning model as described herein.

One or more parameters of the model or of the training of the model (e.g. number of layers in the model, number of neurons per layer, number of epochs, number of training iterations, etc.) may be set in dependence on the layout or spacing of the candidate locations across the environment. Thus the method may comprise determining or adjusting one or more parameters of the model in dependence on the received location data. This may help to optimise the performance of the model during the inference stage.

The model may use any suitable activation function, such as sigmoid, tanh, Leaky ReLU, MAxout, ELU or SELU. Preferably, (especially when a regression model is used) the model uses the ReLU activation function on every layer except the output layer.

In some embodiments, each of the plurality of devices is static (e.g. fixed) in the environment, at least when the measurement data is obtained.

In some embodiments, all of the respective locations for each of the devices are determined by the model simultaneously (e.g. in inference mode). However, the method may comprise determining each respective device location individually, i.e. one at a time. Thus, the model may be run multiple times (i.e. through multiple iterations) in order to determine a respective location for all of the devices.

In some embodiments, the method comprises outputting the determined respective locations for the devices for further processing. The determined respective locations may be output for display, e.g. on a map of the environment. In some embodiments, the method comprises outputting the determined respective locations individually (i.e. one at a time). The method may comprise outputting the determined respective locations for all of the plurality of devices simultaneously.

In some embodiments, the method comprises using the determined locations to assign some or all of the plurality of devices to a respective location from the set of candidate locations. The method may comprise determining a mapping between some or all of the plurality of devices and some or all of the candidate locations. The method may comprise outputting the assigned candidate locations of the respective devices for further processing and/or for display, e.g. on a map of the environment.

In some embodiments, the method comprises identifying, for each of the plurality of devices, a closest candidate location of the set of candidate locations. The method may comprise determining, for a candidate location, that more than one device is closest to the candidate location. It may comprise generating an alert in response to such a determination. The method may comprise, in response to determining that more than one device is closest to the same candidate location, allocating only the closest device to the candidate location and leaving the other device unallocated.

The computer processing system may comprise a PC, laptop, tablet, smartphone or any other suitable processing device. The computer processing system may comprise one or more processors. The computer processing system may comprise memory for storing computer software as disclosed herein for execution by one or more processors of the computer processing system. It may comprise memory for storing data (e.g. weight data for the model)

The computer processing system may comprise one or more input peripherals for accessing (e.g. receiving) the location data and/or the measurement data. The computer processing system may comprise a keyboard and/or a touchscreen for allowing a user to input location data and/or measurement data. The computer processing system may comprise a wired or wireless network interface for communicating with one or more of the plurality of devices. The network interface may comprise a (e.g. radio) transceiver.

The network interface may comprise a wired network connection, e.g. an Ethernet port. The computer processing system may comprise a hardwired TCP/IP Ethernet controller. The devices may comprise respective low power short-range wireless (e.g. radio) communication chips, such as the Nordic Semiconductor nRF52840 chip.

Communicating data between the processing system and at least one of the plurality of devices via a wired (e.g. Ethernet) connection may be advantageous, especially when the devices are configured to perform radio distance ranging techniques, as the likelihood of encountering interference issues between radio signals, which may be high if using radio communication, can be reduced. However, wireless communication between the processing system and at least one of the plurality of devices may be more practicable. For example, for some (e.g. particularly small) devices, it may not be physically possible to connect a cable. It may also be difficult for cables to be installed in particular environments. Wireless communication can help to circumvent these issues, and can also allow the processing system (e.g. a laptop) to be moved around (e.g. within the environment) if necessary.

The computer processing system may comprise a hardware-based random number generator for applying the random variations to the calculated geometric distances. The computer processing system may comprise software storing instructions for implementing a software-based random number generator for applying the random variations.

The software may be stored on a non-transitory computer-readable storage medium, such as a hard-drive, a CD-ROM, a solid-state memory, etc., or may be communicated by a transitory signal such as data over a network.

The methods disclosed herein are preferably computer-implement methods. Any of the method steps disclosed herein may, wherever appropriate, be implemented as steps of the method, using any appropriate hardware and/or software.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

A preferred embodiment for the invention will now be described, by way of example only, with reference to the accompanying drawings, in which.

It is often necessary, when installing and subsequently operating a system of smart devices, to be able to determine the location of a particular one of the devices. Conventionally, this may require individually operating each device and observing the behaviour of the entire set of devices until the operated device is recognised. However, this approach can be slow and labour-intensive. As will now be described, embodiments of the invention provide systems that are able to automatically determine the respective locations of a set of devices.

Figure 1:
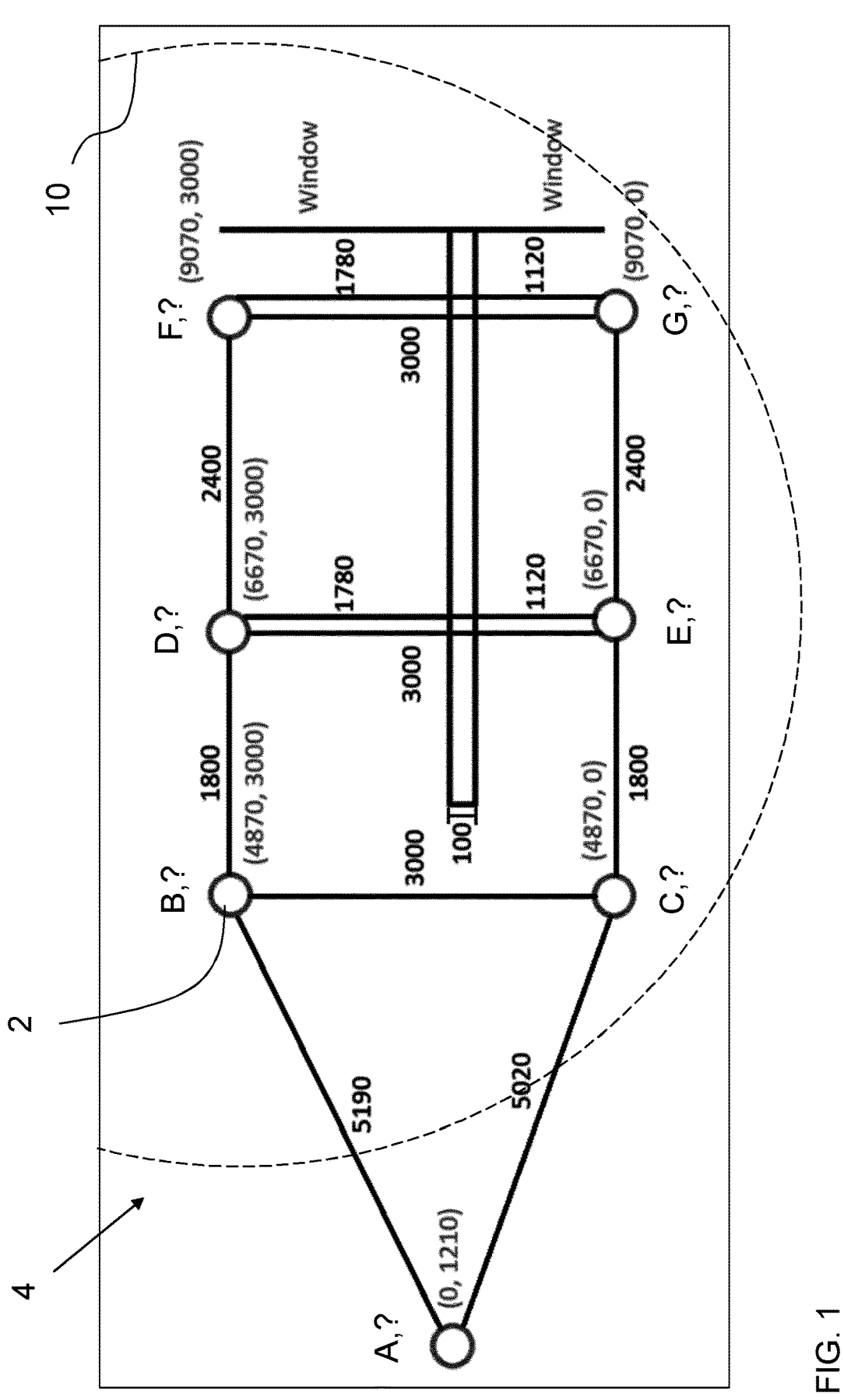
FIG. 1 shows a schematic plan view of a floor of a building comprising the intended locations of a number of smart devices.

FIG. 1 shows a schematic plan view of a floor of a building 4 showing intended locations for a number of smart devices 2. The intended locations A-G of the devices 2 are indicated on the Figure and embody the candidate locations of the present invention.

In one example, the user of the present embodiment is an electrician who is installing a set of seven devices 2 in the building 4, all on the same level. Each device 2 has a respective unique identifier T-Z, which may correspond to a MAC address or serial number for the respective device, or any other suitable identifier that allows a single device 2 to be distinguished from the other six devices 2.

The electrician is given the set of locations A-G (e.g. on a plan of the building) at which to install a respective one of the seven smart devices 2. The x,y coordinates of locations A-G, here expressed in millimetres and in a suitable frame of reference for the building, are represented in the following vector $l^0$, in which each row corresponds respectively to one of the locations A-G.

$$l^0 = \begin{bmatrix} 0, 1210 \\ 4870, 3000 \\ 4870, 0 \\ 6670, 3000 \\ 6670, 0 \\ 9070, 3000 \\ 9070, 0 \end{bmatrix} \quad (1)$$

The coordinates may provide a precise location for each device, or may more generally indicate approximate locations (e.g. as a particular room or office area within the building). Data representing these locations is provided by software embodying the invention. By using the software, the electrician is free to install the devices 2 without being required to laboriously note the identifier T-Z of each device as it is installed at a respective location A-G.

It will be understood that the same approach can be applied to groups of hundreds of devices or more. Removing the burden on the electrician of recording such a large number of device identifiers and corresponding locations can dramatically improve the efficiency of the task. To illustrate the fact that, at this stage, it is unknown to the electrician which of the devices 2 are arranged at which location A-G, the respective device identifier T-Z for each location A-G is represented in FIG. 1 as a question mark.

Figure 2:
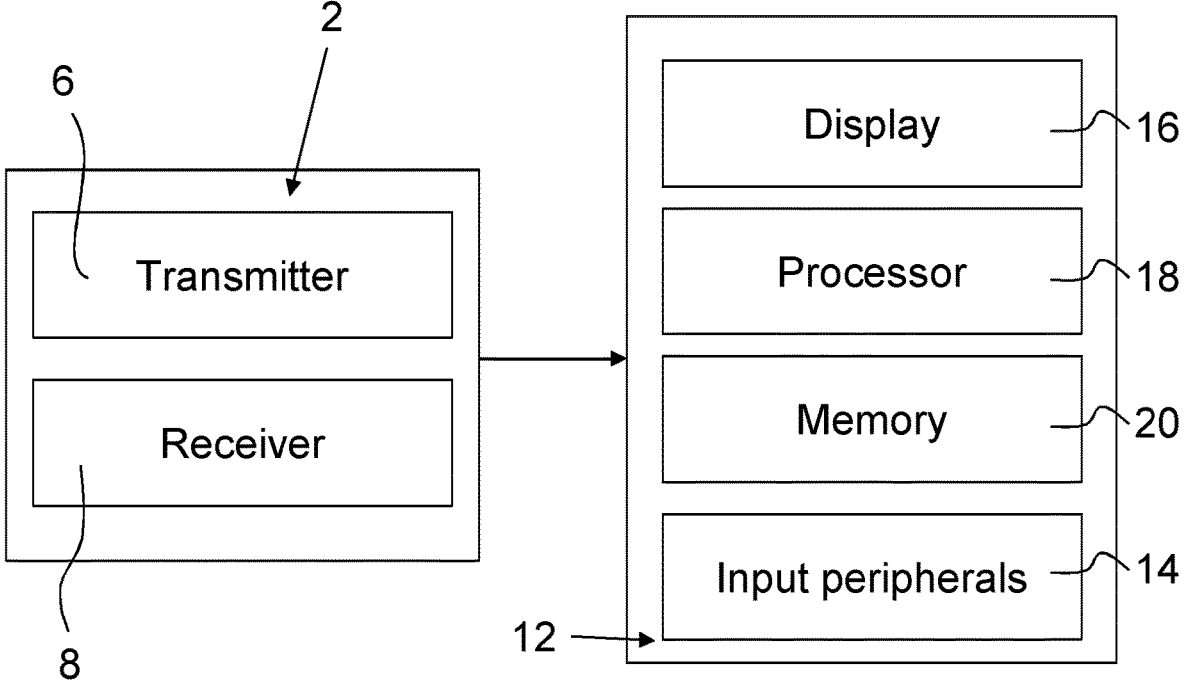
FIG. 2 shows a schematic of a smart device and an exemplary computer processing system for running computer software in accordance with an embodiment of the present invention.

FIG. 2 shows a schematic of one of the smart devices 2 and a schematic of an exemplary computer processing system 12 for running computer software in accordance with an embodiment of the present invention.

Each of the smart devices 2 comprises a radio transmitter 6 and radio receiver 8 for communicating with the other devices 2 and with the computer 12 via Bluetooth (e.g. in a Bluetooth Low Energy mesh network). Each device 2 is configured to carry out radio distance ranging in order to measure the respective distances between itself and all other devices 2 within effective radio range. The ranging here preferably uses phase-based or timing-based techniques to obtain very precise distance measurements, even through walls and other obstacles, rather than received signal strength (RSSI) based ranging which would be much less accurate (although which might still be used in other embodiments). Each device 2, or a subset of the devices 2, may receive instructions from the computer 12 (e.g. in turn) to carry out a distance measurement with another device 2.

By way of example, assuming now that the devices 2 have been installed according to the plan in FIG. 1, the radio range 10 of the device 2 positioned at location D is illustrated in FIG. 1. As can be seen, all other devices 2, except the device 2 at location A, are within the radio range 10 of the device 2 at location D. This means that the device 2 at location D can measure the respective distances to all other devices 2 except the device 2 positioned at location A.

The computer 12 comprises a processor 18 arranged to execute software stored in a memory 20. The computer 12 has input peripherals 14 for receiving measured distance data from one or more of the devices 2 (e.g. through a network interface) and location data $l^0$ for training a machine-learning model (e.g. indirectly through the network interface, or directly as input from a user through a keyboard or touchscreen). The computer 12 further comprises a display 16 configured to present the output of the processing visually to the electrician.

Before or after all of the devices 2 have been installed at respective locations A-G, the electrician inputs the location vector $l^0$ to the input 14 of the computer 12.

The processor 18 then calculates, from the vector $l^0$, all the geometric straight-line distances $d^G$ between each of the locations A-G. The result of this calculation is a matrix $D^G$, which is stored in the memory 20 using any appropriate representation, and is shown below. Some exemplary distance values (in millimetres) are shown in the matrix $D^G$.

$$D^G = \begin{bmatrix} 0 & d_{AB}^G & d_{AC}^G & d_{AD}^G & d_{AE}^G & d_{AF}^G & d_{AG}^G \\ d_{BA}^G & 0 & d_{BC}^G & d_{BD}^G & d_{BE}^G & d_{BF}^G & d_{BG}^G \\ d_{CA}^G & d_{CB}^G & 0 & d_{CD}^G & d_{CE}^G & d_{CF}^G & d_{CG}^G \\ d_{DA}^G & d_{DB}^G & d_{DC}^G & 0 & d_{DE}^G & d_{DF}^G & d_{DG}^G \\ d_{EA}^G & d_{EB}^G & d_{EC}^G & d_{ED}^G & 0 & d_{EF}^G & d_{EG}^G \\ d_{FA}^G & d_{FB}^G & d_{FC}^G & d_{FD}^G & d_{FE}^G & 0 & d_{FG}^G \\ d_{GA}^G & d_{GB}^G & d_{GC}^G & d_{GD}^G & d_{GE}^G & d_{GF}^G & 0 \end{bmatrix} = \quad (2)$$

$$\begin{bmatrix} 0 & 5190 & 5020 & 6910 & 6780 & 9240 & 9150 \\ 5190 & 0 & 3000 & 1800 & 3500 & 4200 & 5160 \\ 5020 & 3000 & 0 & 3500 & 1800 & 5160 & 4200 \\ 6910 & 1800 & 3500 & 0 & 3000 & 2400 & 3840 \\ 6780 & 3500 & 1800 & 3000 & 0 & 3840 & 2400 \\ 9240 & 4200 & 5160 & 2400 & 3840 & 0 & 3000 \\ 9150 & 1560 & 4200 & 3840 & 2400 & 3000 & 0 \end{bmatrix}$$

For example, in the above matrix $D^G$, the distance from location B to location A is represented by $d_{BA}{}^G = 5190$ mm.

The processor 18 is further instructed, by the software, to apply alterations to the distance values $d^G$ within the geometric distance matrix $D^G$ in order to simulate real-world behaviour for use in training a machine-learning model. Applying these variations helps to improve the performance of the model, as the training data can more closely reflect the input data that it will receive during the inference process. The variations aim to simulate effective radio range constraints, as well as measurement imprecision in the radio-ranging distance estimates.

In a first step, a random number generator (hardware- or software-based) is used to generate a respective first random number, within a first predefined range (e.g. 4000 mm to 5000 mm), for each of the distance values $d^G$. The processor 18 is instructed to compare each distance value $d^G$ within the matrix $D^G$ with the respective first random number. If the respective distance value $d^G$ is equal to or less than the respective first random number, the pair of locations are considered to be within radio range of each other, and the originally calculated distance value $d^G$ is maintained. However, if the respective distance value $d^G$ is greater than the respective first random number, the pair of locations are considered to be out of radio range of each other, and the respective distance value $d^G$ is set to zero.

In a second step, a respective second random number is generated, within a second predefined range (e.g. −250 mm to 250 mm), for each of the distance values $d^G$. The system is configured to add the respective second random number to each of the non-zero distance values $d^G$ within the matrix $D^G$ in order to simulate measurement deviations in the distances $d^G$ between the devices 2. The random numbers may be determined by a uniformly distributed random variable, over their respective ranges, or from any appropriate statistical distribution, such as a normal or Gaussian distribution.

The result of these calculations is a matrix $D^S$ of synthetic distance measurements $d^S$. The above two steps are repeated n times (e.g. n=500) in order to generate n matrices $D^S$, which are combined to produce a single set of "features" training data, which is used, together with n iterations of the location vector $l^0$ (providing the output "labels"), for training the machine learning model. Thus, at least in some embodiments, the model is trained, over multiple iterations, using one large input dataset and one large output dataset, each having the same number of rows.

In the above first and second steps, geometric distance values $d^G$ corresponding to the same distance (e.g. $d_{BA}{}^G$ and $d_{AB}{}^G$, or $d_{CD}{}^G$ and $d_{DC}{}^G$) may be modified by different amounts. This simulates how, when the devices 2 generate measured distance measurements, two different measurements for the same physical separation distance may be obtained, depending on which of the pair of devices 2 initiates the measurement (e.g. depending on whether the distance is measured from location A to location B or from location B to location A). Such measurement differences may be caused, for example, by changes in the environment during the measurement process (e.g. humans moving around within the environment).

The combined set of matrices $D^S$ may be normalised to within a small standard interval (e.g. between −1 and 1 or between 0 and 1). This can help to improve the synergy between the model inputs and the internal weights of the machine-learning model, implemented by the software, and reduce the likelihood of the computer 12 encountering numerical overflow issues.

The machine learning model is a regression-based model, which is trained using a mean absolute error (MAE) loss function. Other embodiments may, however, use different models. The model is trained to generate a vector $l^1$ of predicted locations based on the location vector $l^0$ and the combined set of n matrices $D^S$ of synthetic distance measurements $d^S$ Once the model has been trained (or even before it has been trained, or while it is being trained), the electrician (or the software) instructs the devices 2 to carry out (e.g. radio) ranging in order to generate data representative of the true distances between each of the physical devices 2.

The resulting measurement data comprises measured distance measurements $d^M$, which are transmitted to the computer 12 and are stored in the memory 20. The measured distance measurements are represented in the matrix $D^M$ below.

$$D^M = \begin{bmatrix} 0 & d_{TU}^M & d_{TV}^M & d_{TW}^M & d_{TX}^M & d_{TY}^M & d_{TZ}^M \\ d_{UT}^M & 0 & d_{UV}^M & d_{UW}^M & d_{UX}^M & d_{UY}^M & d_{UZ}^M \\ d_{VT}^M & d_{VU}^M & 0 & d_{VW}^M & d_{VX}^M & d_{VY}^M & d_{VZ}^M \\ d_{WT}^M & d_{WU}^M & d_{WV}^M & 0 & d_{WX}^M & d_{WY}^M & d_{WZ}^M \\ d_{XT}^M & d_{XU}^M & d_{XV}^M & d_{XW}^M & 0 & d_{XY}^M & d_{XZ}^M \\ d_{YT}^M & d_{YU}^M & d_{YV}^M & d_{YW}^M & d_{YX}^M & 0 & d_{YZ}^M \\ d_{ZT}^M & d_{ZU}^M & d_{ZV}^M & d_{ZW}^M & d_{ZX}^M & d_{ZY}^M & 0 \end{bmatrix} \quad (3)$$

As can be seen, each distance measurement $d^M$ is now associated with a respective pair of device identifiers T-Z (e.g. MAC addresses) as a result of the ranging process. For example, in the above matrix $D^M$, the measured distance from device U to device T (e.g. as measured by device U, with device U acting as the initiator, and device T acting as a reflector) is represented by the value $d_{UT}{}^M$. This is in contrast to the matrix $D^G$ of candidate locations, which did not have associated device identifiers, but only locations.

The matrix $D^M$ is input to the trained model, operating in inference mode, which generates, from the measured distance measurements of the matrix $D^M$, a vector $l^1$ of predicted locations.

$$l^1 = \begin{bmatrix} l_T^1 \\ l_U^1 \\ l_V^1 \\ l_W^1 \\ l_X^1 \\ l_Y^1 \\ l_Z^1 \end{bmatrix} \quad (4)$$

Each entry in the above vector $l^1$ corresponds to a predicted set of x,y coordinates for a respective device 2 having a corresponding identifier T-Z.

Because the model is a regression model, rather than a classifier, these coordinates do not have to equal the coordinates of the intended locations used in the training of the model. However, in many cases, it is reasonable to expect that they should closely align, since the electrician may reasonably be assumed to have installed the devices in exactly, or close to, the intended locations.

Nevertheless, in order to determine the precise location of each of the devices T-Z, the processor 18 may, at least in some embodiments, map the calculated locations within the vector $l^1$ to the intended locations within the vector $l^0$. It may do so by identifying the closest intended (candidate) location to each calculated location. Where more than one device is closest to the same intended location, a conflict arises. This may be dealt with in various ways, such as allowing both to be assigned to the same location but alerting the operator to this, or by allocating only the closest device to the location and potentially leaving the other device unallocated. Thus, each device T-Z can be assigned to a respective location from the input set of locations $l^0$ using the predicted device location calculated by the model.

However, in some embodiments, the predicted x,y coordinate for each device T-Z, generated by the model, may be output as the final location for each device. This may be the case when, for example, the initial set of coordinates are approximate locations of the devices 2 and the predicted locations are considered to be more accurate.

Figure 3:
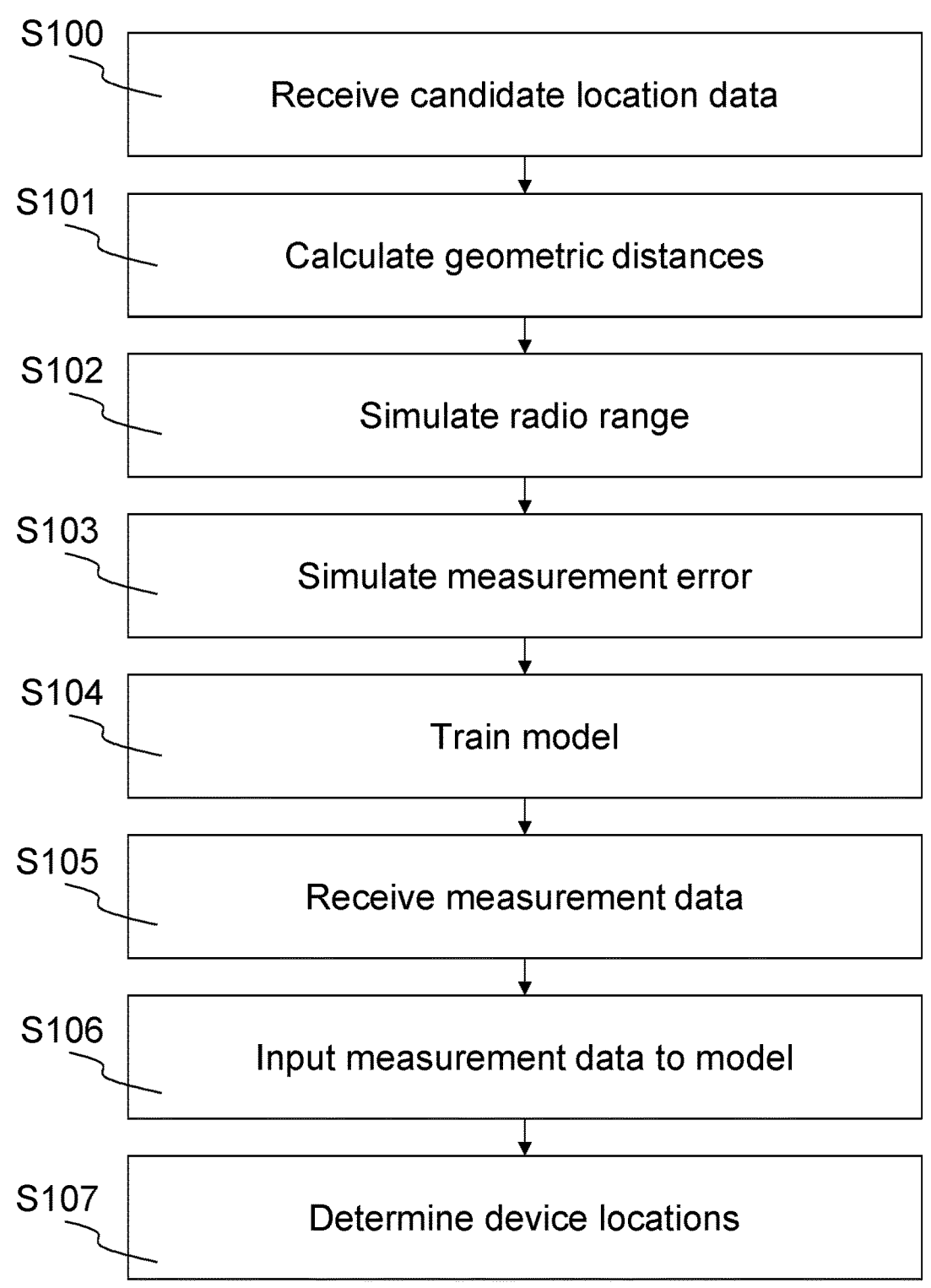
FIG. 3 shows a flowchart of a method in accordance with an embodiment of the present invention.

FIG. 3 shows a flowchart of the above-described method carried out in accordance with an embodiment of the present invention.

In a first step S100, the set of candidate location data $l^0$ is received by the processor 18 of the computer 12. In step S101 the processor 18 is configured to calculate the matrix $D^G$ of geometric distances between all of the locations A-G.

In step S102, a respective first randomly generated number is compared with each of the calculated geometric distance values $d^G$, contained within the matrix $D^G$. In order to simulate radio range limitations that may prevent any ranging data from being calculated between a particular pair of devices, those values $d^G$ that are greater than the respective random number are replaced with a zero.

In step S103, in order to simulate distance measurement error, the processor 18 generates a respective second randomly generated number for each of the non-zero geometric distance values $d^G$. The respective second randomly generated number is added to the corresponding distance values $d^G$. The output of step S103 is the matrix $D^S$ of synthetic distance measurements.

In step S104, the matrix $D^S$ is input to the model as the "features" training data. The model is trained, using this "features" training data and the "labels" candidate location data $l^0$, to generate data representative of a set of estimated locations.

In step S105, the devices 2 are instructed to perform radio distance ranging and to send the resulting distance measurement data $D^M$ to the processor 18 of the computer 12. As a result of the radio ranging operation, each of the distance measurements is associated with a respective device identifier T-Z.

In step S106, the distance measurement data $D^M$ is input to the trained model, which outputs a set of estimated locations $l^1$, in which each location is uniquely associated with a respective device identifier T-Z.

In an optional step S107, the processor 18 maps the set of estimated locations $l^1$ onto the set of candidate locations $l^0$ such that a respective device identifier T-Z is uniquely assigned to each of the candidate locations $l^0$. The result of this step is shown on the display 16 of the computer 12, e.g. in a table of device identifiers T-Z and corresponding locations A-G.

Simulated and Experimental Results

Software embodying the invention and implementing the principles described above was written and tested on simulated real-world ranging data, as well as on real physical devices. Details of these experiments and the results obtained are presented below. These are presented by way of example only, but they demonstrate the efficacy of this approach for determining locations of devices.

Parameter Selection

A trial and error approach was used to find the optimal values of the tunable parameters of the machine learning model.

Selection of Machine Learning Framework

Options considered for which machine learning framework to use were TensorFlow (developed by Google) and PyTorch (developed by Facebook). TensorFlow was chosen, mainly because of the larger community (e.g. the availability of example code and forum discussions).

Outputs of the Model

Models using classification (i.e. where every node has a label and the predictions comprise a probability for each label) were considered, but a regression approach was adopted instead as it is more straightforward to structure the data for a regression model. Data were output from the model in a matrix in which row indexes are used as device indexes. The rows in the output matrix comprise x,y coordinates that correspond to the respective devices. This means that two numerical values are output for each device location prediction calculated by the model.

Selection of Learning Algorithm

The data sets could be fully loaded into RAM, meaning that in-memory vs out-of-memory restrictions could be avoided.

Since the training features (inputs) are artificially generated, the data sets can be huge (several gigabytes) if needed. This enables the use of neural network algorithms.

All the features (inputs) are numerical, and no conversions from categorical to numerical features are needed.

There is a "linear link" between distances and positions. However, when measurement deviations ("noise") and other sources of randomness are introduced, the problem becomes more complex. This means that a neural network is a good type of model to use.

As there are not necessarily any hard limits on the length of training time or the time taken to generate a prediction, complex neural networks can be trained.

Selection of Tunable Parameters

A test bench using a simulated area of 30×30 meters was used and model parameters were changed to see the difference in performance. The performance was measured by studying the error distance graphs produced (see FIGS. 4-13). Training data was generated using radio range and distance measurement deviations with randomness that mimics the real world. The simulated real-world (testing data) measurement deviations were set to random values between −3000 mm and 3000 mm. Nodes were randomly positioned, and the amount of nodes as set so that every node was in radio range with approximately 10 other nodes.

The initial values of parameters before tuning were:

Number of layers (including input and output layer): 3

Number of neurons per layer: 64

Epochs: 3

Neuron connection density: Completely dense

Initialisers: 'he_uniform' on the input layer

Activation functions: 'relu' on every layer except the output layer

Loss function: Mean Absolute Error ('mae')

Optimiser: 'adam'

Number of training iterations: 100

Training data distance measurement deviations: less than real-world deviations

All model input distance data was normalised. The parameters were tuned in the order in which they are described below. The parameters that were not determined empirically were chosen based which parameters are expected to work best for this type of machine learning.

The number of layers, number of neurons in each layer, and number of epochs, were decided by an empirical approach. It was discovered that these three parameters are dependent on each other and that they should be increased in parallel, rather than increasing one and keeping the others constant.

FIGS. 4, 5, 6 and 7 show graphs of the distance prediction error with varying model parameters. The error distance is defined as the distance from the actual position to the calculated/predicted positon of each node. The x-axis represents the distance errors in millimetres and the y-axis represents the number of nodes that have each distance error.

Figure 4:
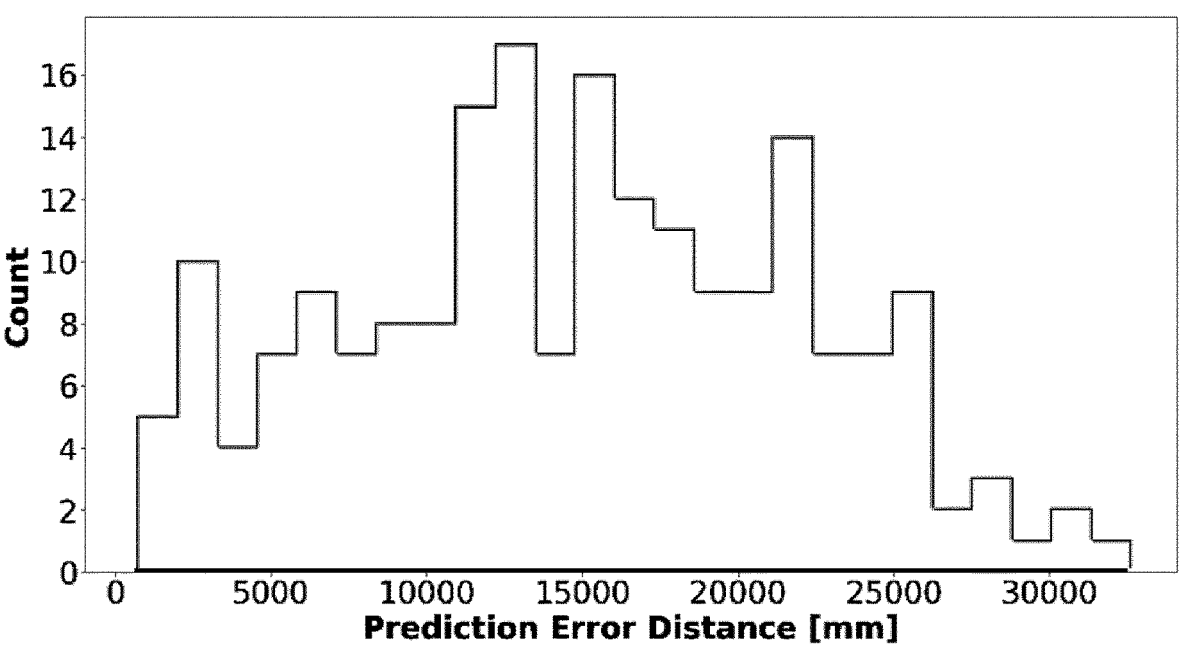
FIG. 4 shows a prediction error graph from testing of an embodiment that uses a model comprising 3 layers, with 64 neurons per layer, over 3 epochs.

FIG. 4 shows the performance of a model comprising 3 layers, with 64 neurons per layer, over 3 epochs.

Figure 5:
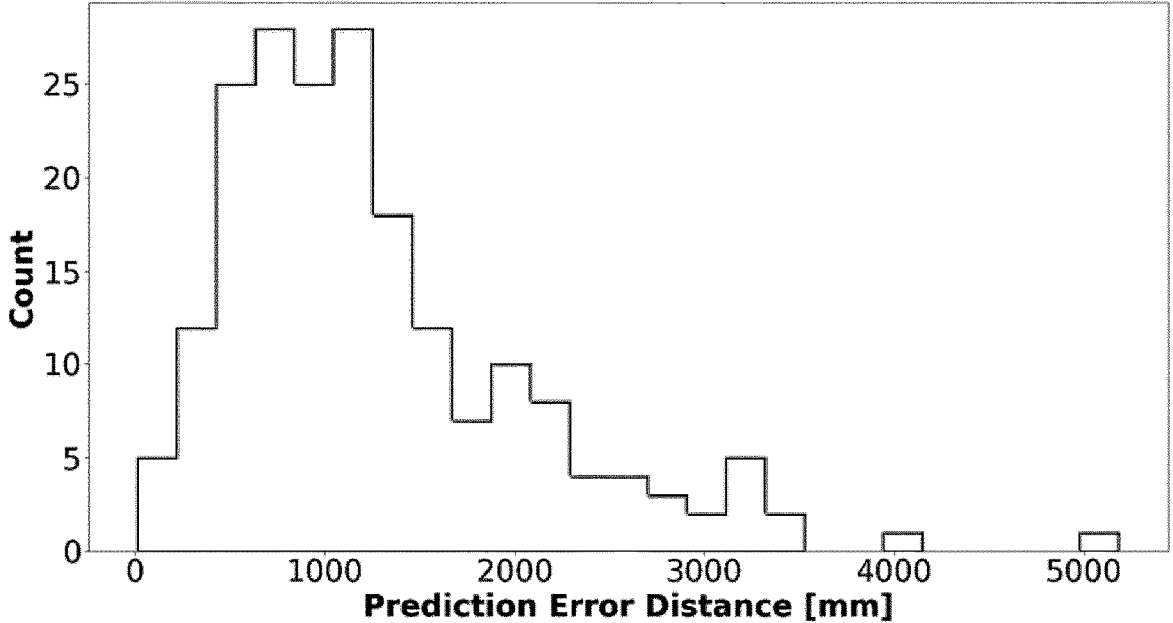
FIG. 5 shows a prediction error graph from testing of an embodiment that uses a model comprising 5 layers, with 128 neurons per layer, over 8 epochs.

FIG. 5 shows the performance of a model comprising 5 layers, with 128 neurons per layer, over 8 epochs.

Figure 6:
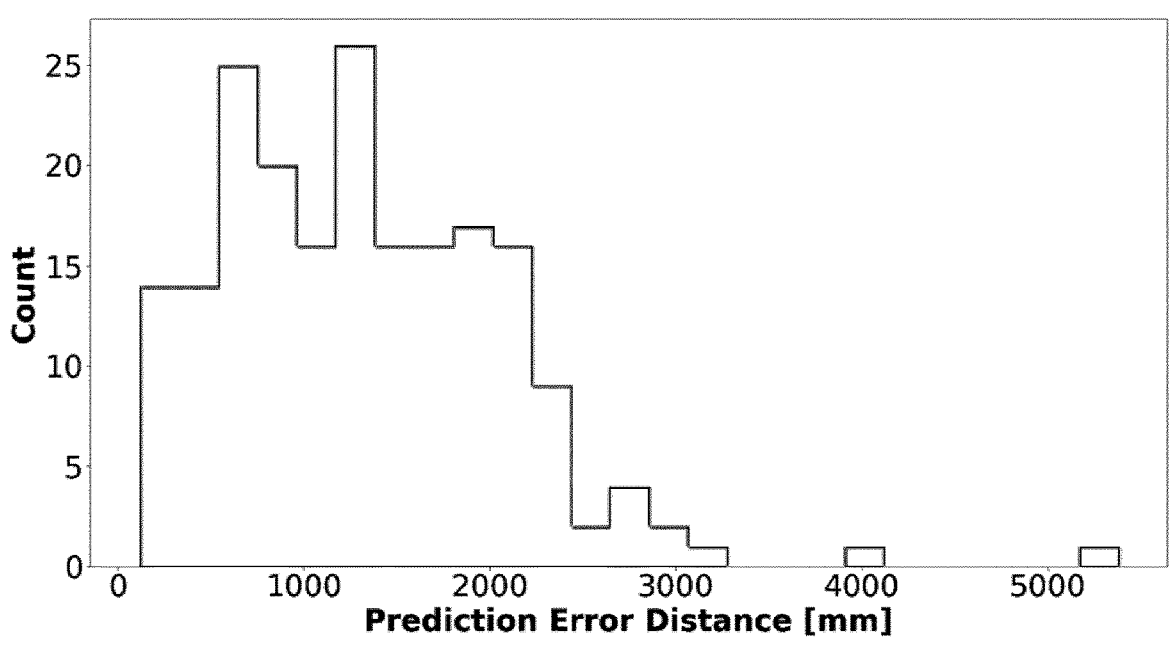
FIG. 6 shows a prediction error graph from testing of an embodiment that uses a model comprising 6 layers, with 256 neurons per layer, over 15 epochs.

FIG. 6 shows the performance of a model comprising 6 layers, with 256 neurons per layer, over 15 epochs.

Figure 7:
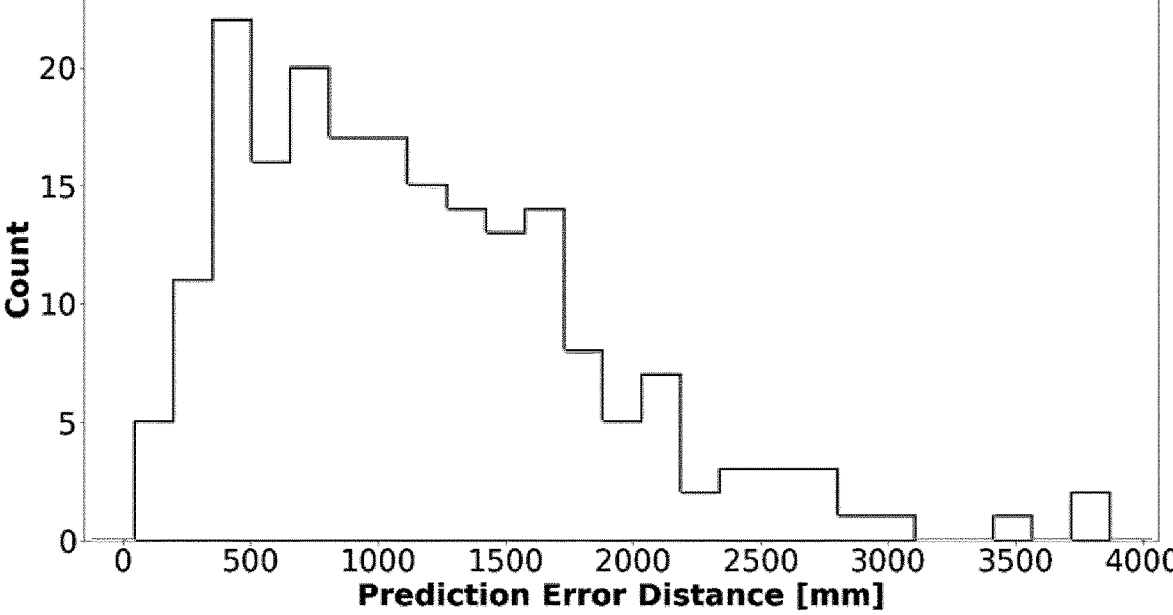
FIG. 7 shows a prediction error graph from testing of an embodiment that uses a model comprising 8 layers, with 512 neurons per layer, over 30 epochs.

FIG. 7 shows the performance of a model comprising 8 layers, with 512 neurons per layer, over 30 epochs.

There is a large increase in performance between the set of parameters represented by FIG. 4 and those represented by FIGS. 7.

Regarding the density of connections between neurons, it was decided to use completely dense connections between neurons. As the training data and the data used after training are deliberately made as similar as possible, overfitting is not an issue.

A he_uniform initialiser was used during testing of the present embodiments. Changing initialisers on different layers did not seem to improve the performance.

Figure 8:
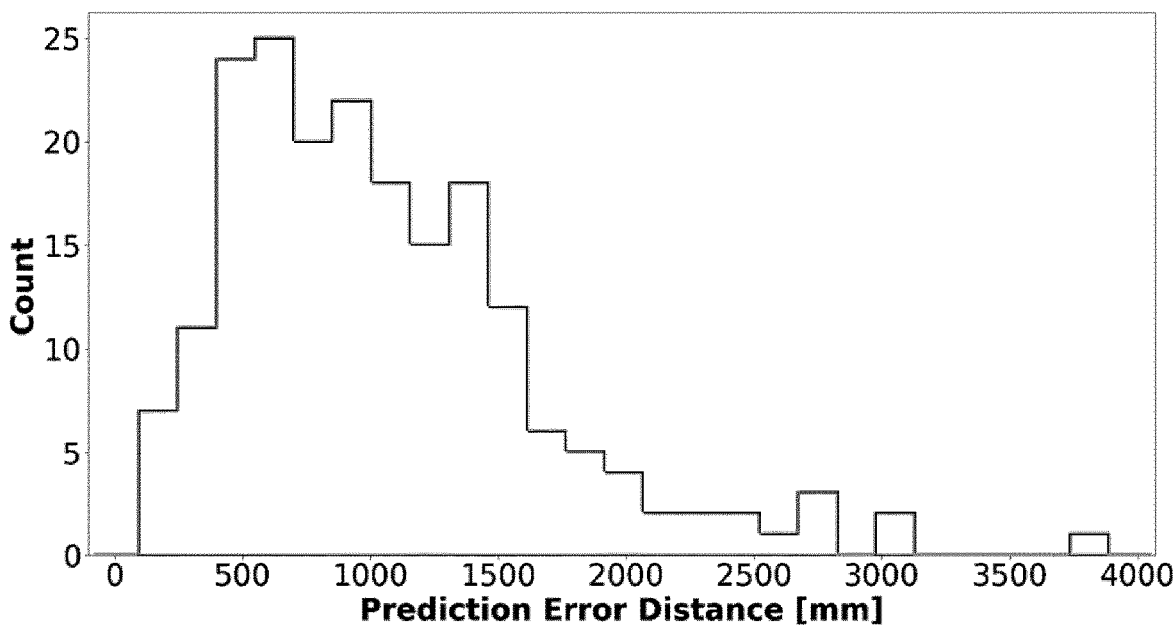
FIG. 8 shows a prediction error graph from testing of an embodiment that uses a model when using SELU activation functions.

The ReLU class of activation functions was used, of which SELU activation functions showed a slight increase in performance. FIG. 8 shows the performance of the model when using SELU activation functions. Thus, it was decided to use SELU activation functions on every layer except the output layer.

Various loss functions suitable for regression-based machine learning models were tested. The "Mean Absolute Error" loss function provided the best performance.

The "Adam" optimiser was used.

The number of training data iterations is the number of times all nodes are iterated through and given synthetic distance measurements for every iteration. During testing, when fewer than 100 training data iterations were performed, the performance of the model was relatively poor. When increasing the number of iterations to over 100 there were some minor performance improvements. It was also discovered that increasing the number of layers, the number of neurons per layer, and the number of epochs, when using more than 100 iterations, resulted in more noticeable performance gains.

Figure 9:
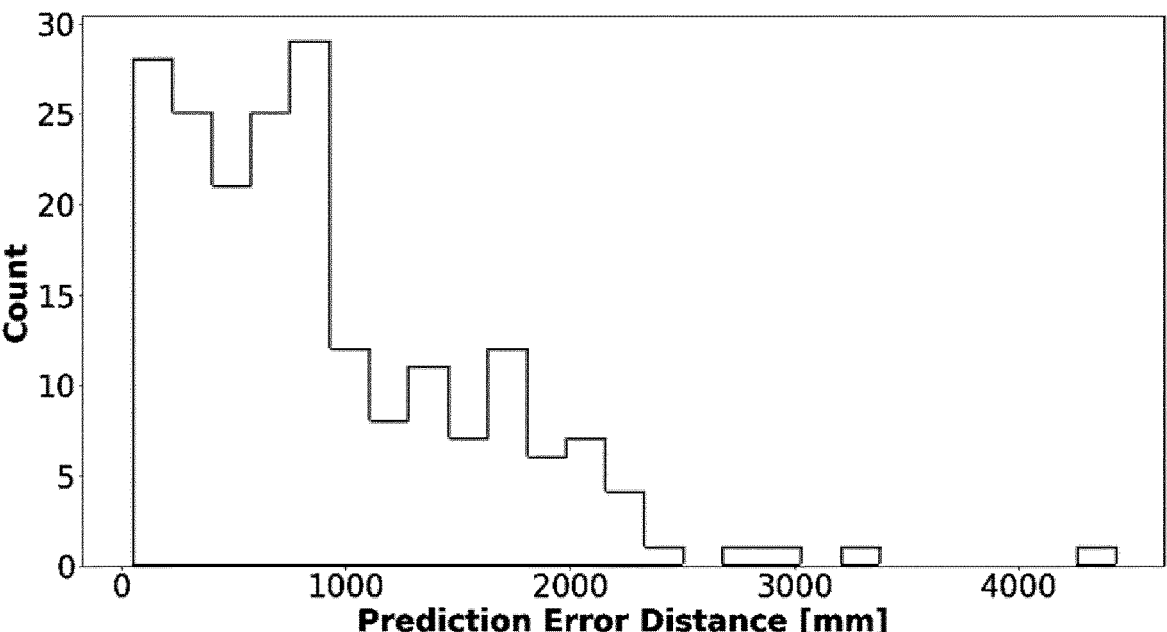
FIG. 9 shows a prediction error graph from testing of an embodiment that uses a model comprising 7 layers, with 256 neurons per layer, over 15 epochs with 500 training data iterations.

FIG. 9 shows the performance of a model comprising 7 layers, with 256 neurons per layer, over 15 epochs with 500 training data iterations.

Figure 10:
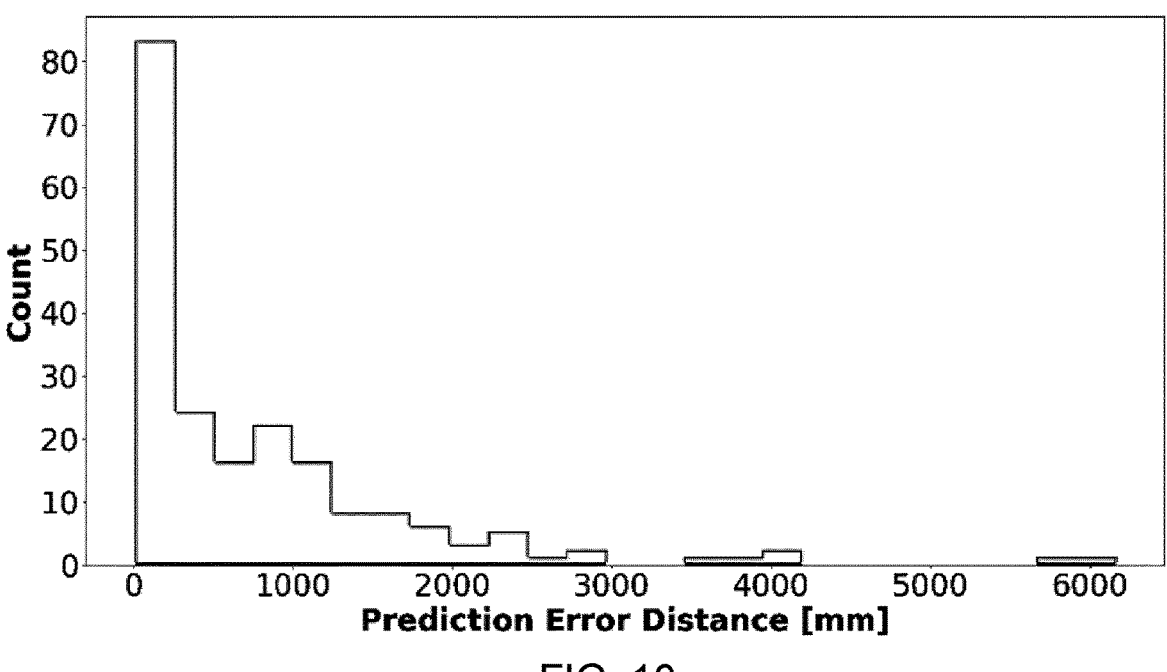
FIG. 10 shows a prediction error graph from testing of an embodiment that uses a model comprising 9 layers, with 512 neurons per layer, over 30 epochs with 500 training data iterations.

FIG. 10 shows the performance of a model comprising 9 layers, with 512 neurons per layer, over 30 epochs with 500 training data iterations.

Thus, it was determined that a reasonable combination is 500 training data iterations, 9 layers, 512 neurons per layer and 30 epochs.

For the purposes of testing the model, the simulated real-world distance measurement deviations were set to a random distance between −3000 mm and 3000 mm. The training data measurement deviations were varied in order to determine whether the training data measurement deviations should be less than real-world deviations, the same as the real-world deviations or more than the real-world deviations.

Figure 11:
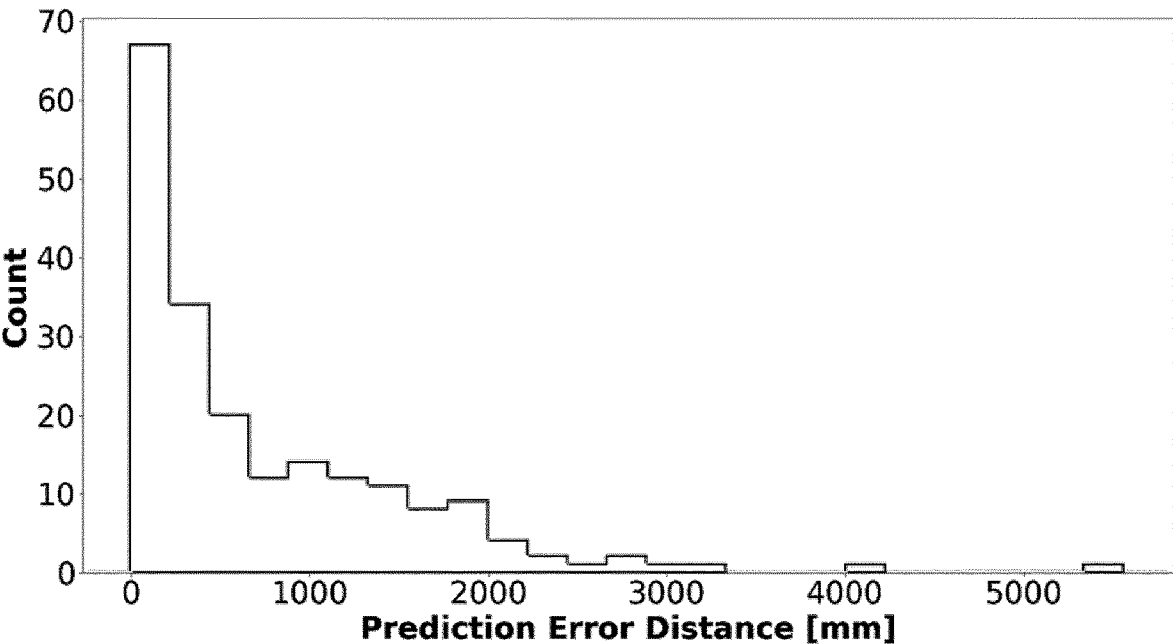
FIG. 11 shows a prediction error graph from testing of an embodiment that uses a model when training data deviations are +/−250 mm and testing data deviations are +/−3000 mm.
Figure 12:
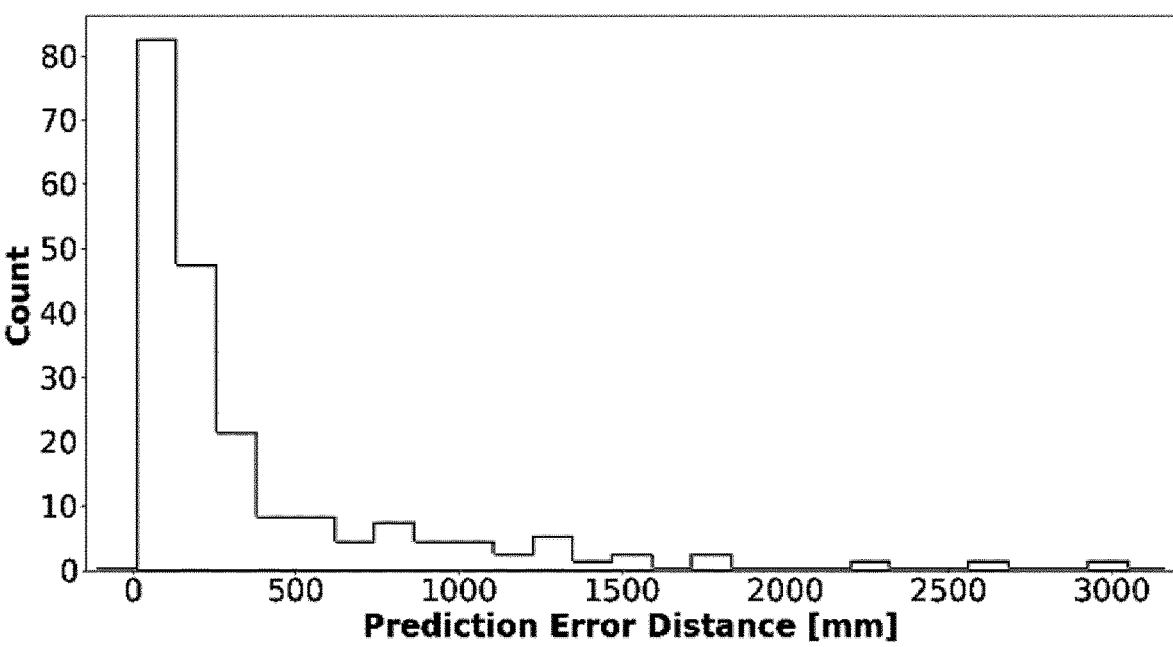
FIG. 12 shows a prediction error graph from testing of an embodiment that uses a model when training data deviations are +/−3000 mm and testing data deviations are +/−3000 mm.
Figure 13:
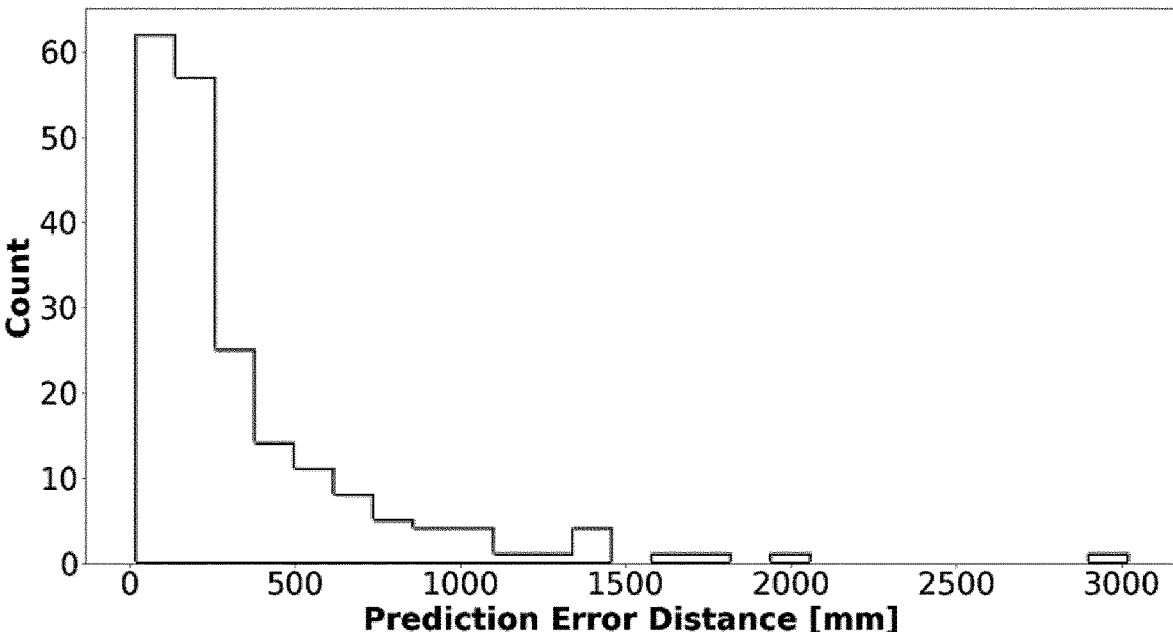
FIG. 13 shows a prediction error graph from testing of an embodiment that uses a model when training data deviations are +/−5000 mm and testing data deviations are +/−3000 mm.

FIGS. 11, 12 and 13 show the performance of a model with different training data measurement deviations.

FIG. 11 shows the performance of a model when training data deviations are +/−250 mm and testing data deviations are +/−3000 mm.

FIG. 12 shows the performance of a model when training data deviations are +/−3000 mm and testing data deviations are +/−3000 mm.

FIG. 13 shows the performance of a model when training data deviations are +/−5000 mm and testing data deviations are +/−3000 mm.

It can be seen from FIGS. 11-13 that performance is improved when using training data measurement deviations that are the same as, or larger than, the real-world measurement deviations. Using the same range of deviation provides approximately the same performance as using a larger range of deviation. Therefore, we decided to use training data measurement deviations that are the same as the real-world measurement deviations.

As a result of testing the model in the simulated environment, the following parameters were identified as suitable:

Number of layers (including input and output layer): 9
Number of neurons per layer: 512
Epochs: 30
Neuron connection density: Completely dense
Initialisers: 'he_uniform' on the input layer Activation functions: 'selu' on every layer except the output layer
Loss function: Mean Absolute Error ('mae')
Optimiser: 'adam'
Number of training iterations: 500
Training data distance measurement deviations: same as real-world deviations Simulations The simulation environment is defined to be a 30×30 meter space with nodes placed randomly throughout the area. All distances and coordinates are in millimetres.

The nodes are simulated to be in radio range if they are between 4 and 5 meters apart. This distance was chosen in order to minimise the number of nodes that are considered to be in radio range. This was done in order to more closely reflect the intended operation conditions.

Node density (i.e. the minimum number of nodes that fall within the simulated "radio range" of each node) and node placement patterns can change for every implementation and can be difficult to define generally. Different node configurations were considered during the simulation process. The performance of the model when "actual" node positions were not included in the training data was also investigated.

FIGS. 14-17 show performance graphs of the simulation process with varying node densities.

Figure 14:
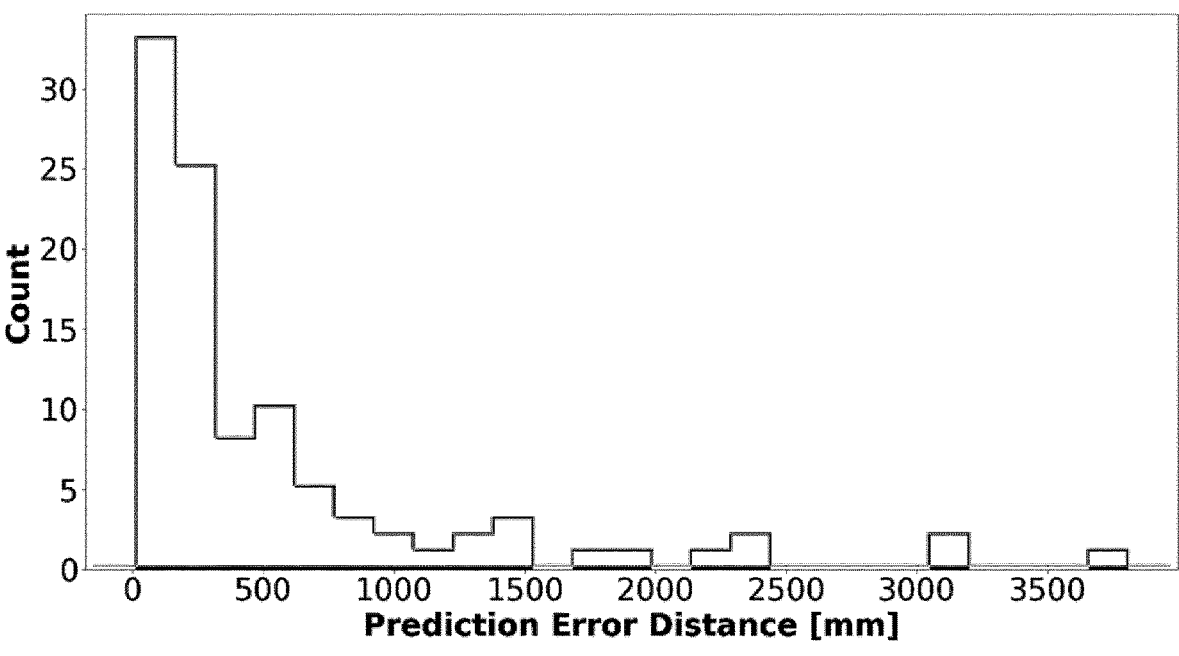
FIG. 14 shows a prediction error graph from testing of an embodiment when every node is within "radio range" of approximately 5 other nodes.

FIG. 14 shows the performance of the model when every node is within "radio range" of approximately 5 other nodes.

Figure 15:
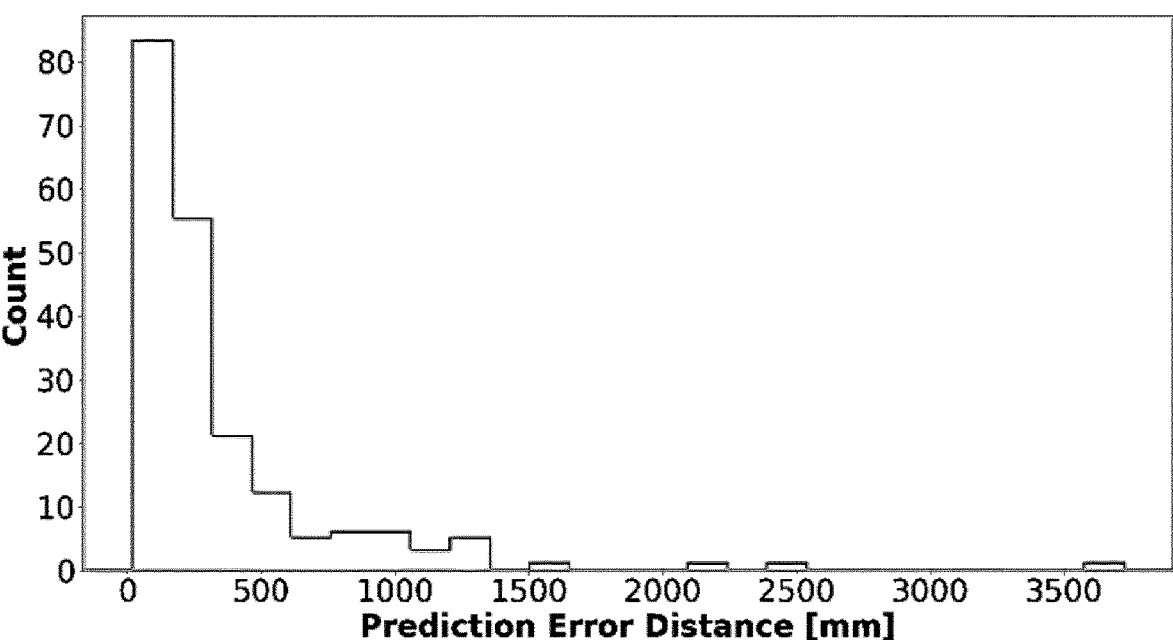
FIG. 15 shows a prediction error graph from testing of an embodiment when every node is within "radio range" of approximately 10 other nodes.

FIG. 15 shows the performance of the model when every node is within "radio range" of approximately 10 other nodes.

Figure 16:
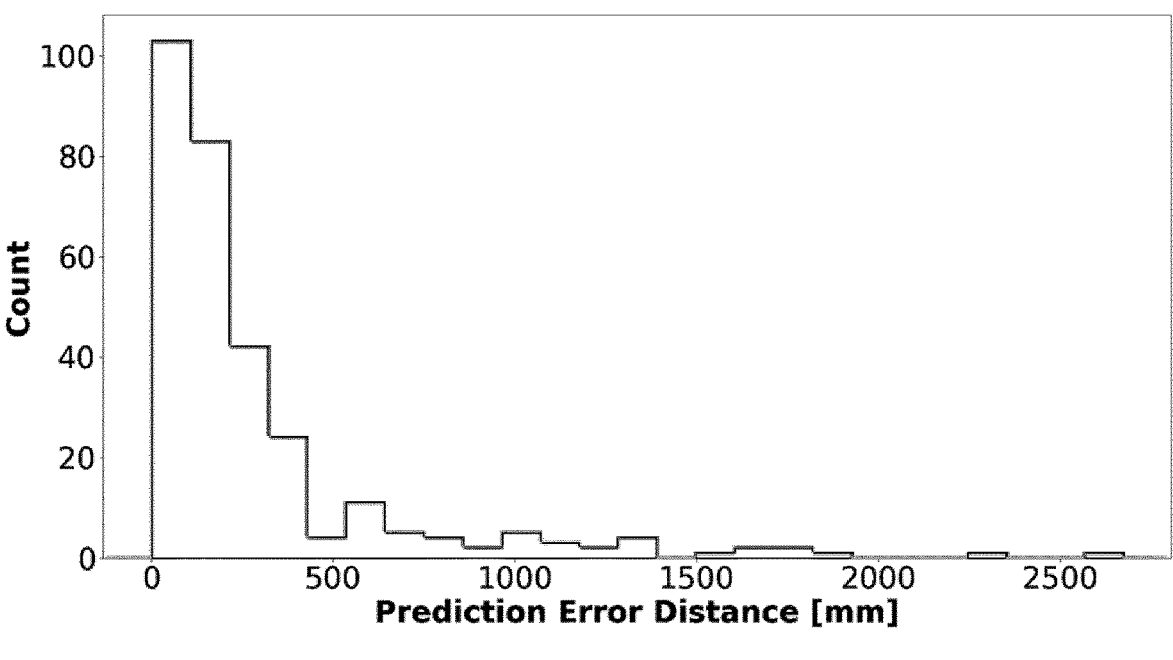
FIG. 16 shows a prediction error graph from testing of an embodiment when every node is within "radio range" of approximately 15 other nodes.

FIG. 16 shows the performance of the model when every node is within "radio range" of approximately 15 other nodes.

Figure 17:
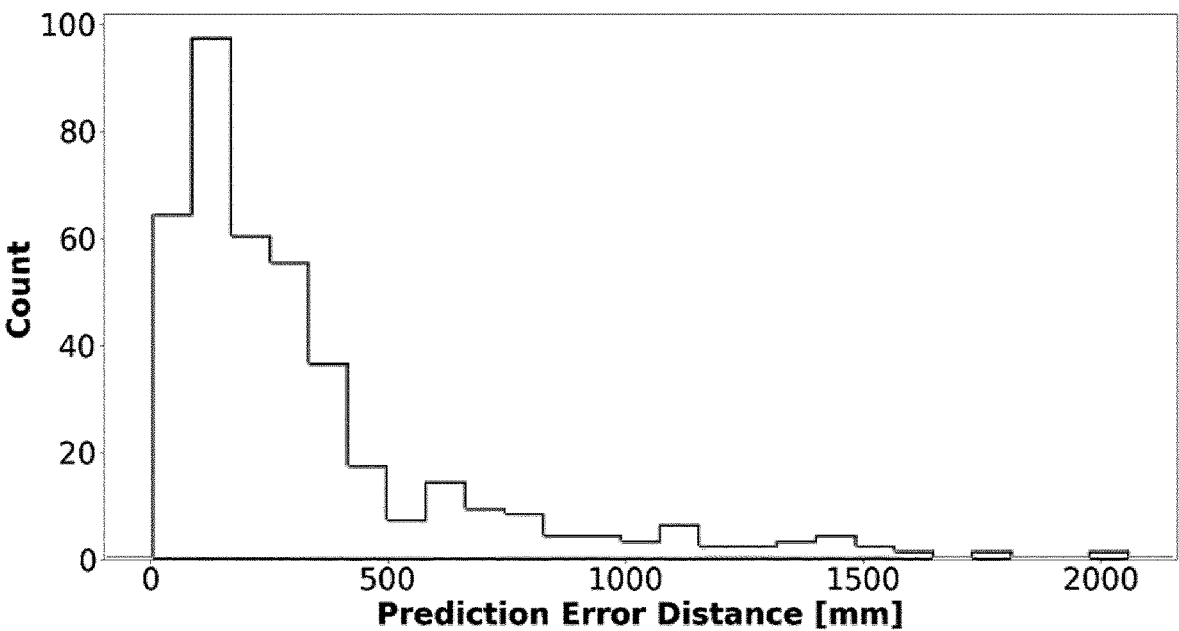
FIG. 17 shows a prediction error graph from testing of an embodiment when every node is within "radio range" of approximately 20 other nodes.

FIG. 17 shows the performance of the model when every node is within "radio range" of approximately 20 other nodes.

As can be seen from FIGS. 14-17, node density does not impact the performance of the model.

Figure 18:
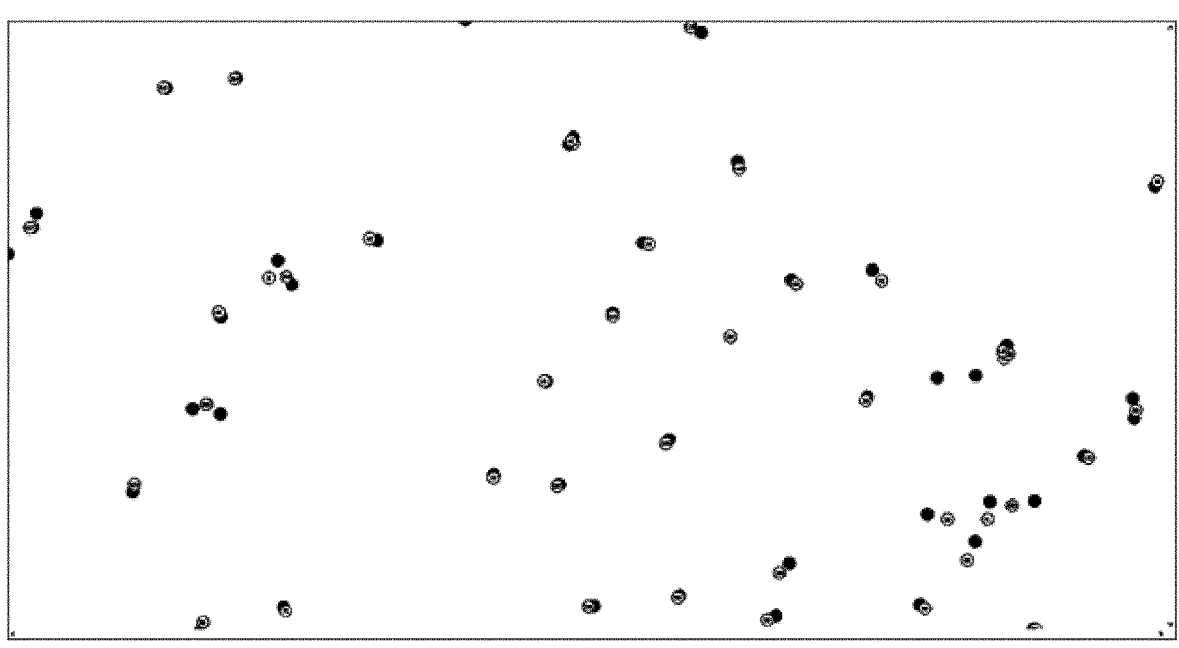
FIG. 18 shows the output of an embodiment when the simulated input nodes are arranged randomly.
Figure 19:
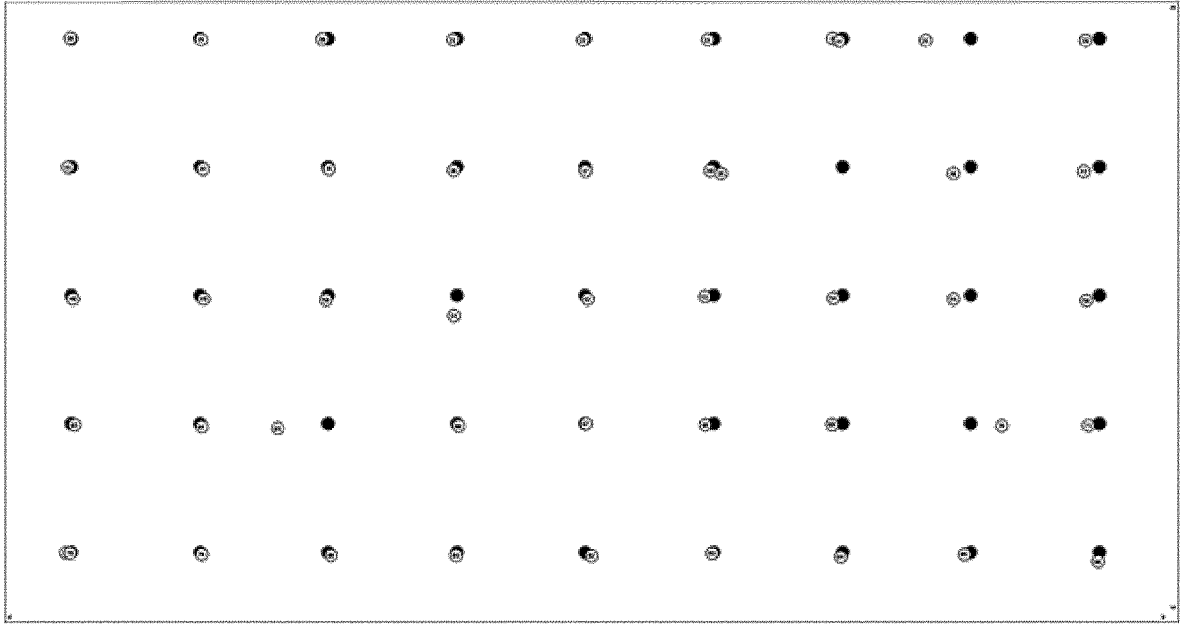
FIG. 19 shows the output of an embodiment when the simulated input nodes are arranged in a grid.

FIGS. 18 and 19 show plots of the simulated ("actual") locations of nodes and the estimated locations of the nodes generated by the model when the simulated nodes are arranged in different patterns. In FIGS. 18 and 19 the "true" device locations are indicated by solid black discs, whereas the predicted locations are indicated by white circles.

FIG. 18 shows the simulated and estimated locations of the nodes when the simulated nodes are arranged randomly.

FIG. 19 shows the simulated and estimated locations of the nodes when the simulated nodes are arranged in a grid.

In the simulation in which nodes are positioned randomly (as shown in FIG. 19), there are several nodes that cannot be mapped to their "actual" location, as a different node has been mapped to that location instead (e.g. because the estimated position for the different node is closer to said location).

In the simulation in which nodes are positioned in a grid, almost all of the nodes can be mapped to their actual position. Thus, performance is improved when nodes are arranged in a grid. For many use cases, the positions of devices may be more grid-like (e.g. when the devices comprise light bulbs).

Optimal parameter values may change depending on the set of candidate locations.

Therefore, in some embodiments, the input matrix of known locations ($l^o$) may be analysed, and parameter values may be adjusted according to the specific arrangement.

Real-world testing of the model was also carried out using twenty-one real devices (PCA20036 boards with Ethernet connections) positioned at irregular locations in the ceiling of an office. It was found that a model with the following parameters gave good results:

Number of layers (including input and output layer): 12

Number of neurons per layer: 1024

Epochs: 5

Neuron connection density: Completely dense

Initialisers: 'he_uniform' on the input layer

Activation functions: 'selu' on every layer except the output layer

Loss function: Mean Absolute Error ('mae')

Optimiser: 'adam'

Number of training iterations: 7000

Training data distance measurement deviations: +/−3500 mm

Training data radio range variations: 8000 mm-20000 mm

Figure 20:
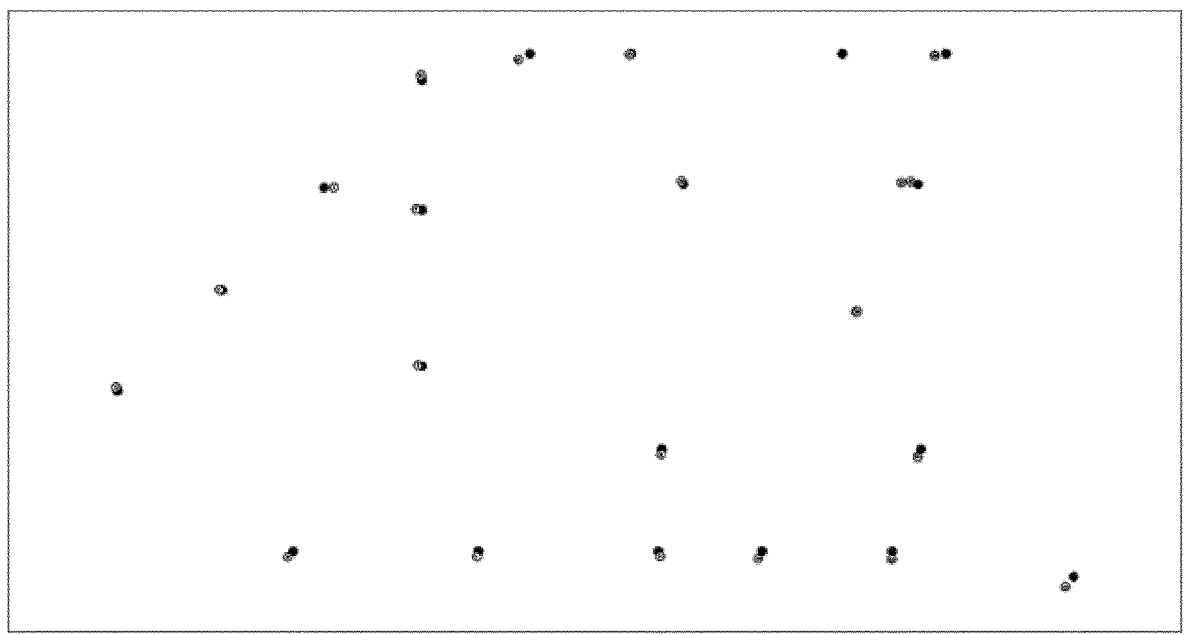
FIG. 20 shows the output from testing an embodiment in a real-world setup.

FIG. 20 shows the output from testing an embodiment in a real-world setup. In FIG. 20, the "true" device locations (i.e. candidate locations) are indicated by the black discs, whereas the predicted locations output by the model, after training, are indicated by the white circles.

As can be seen from FIG. 20, the model performed well, by outputting locations for twenty of the devices that were very close to their true device locations. Although not visible in FIG. 20, the assignment of devices to locations (i.e. which device identifier was assigned to which candidate location) was correct for all twenty device. Only one device (near the top-right corner) was given a predicted location that was not close to its true location, but was instead close to an already-assigned candidate location.

Figure 21:
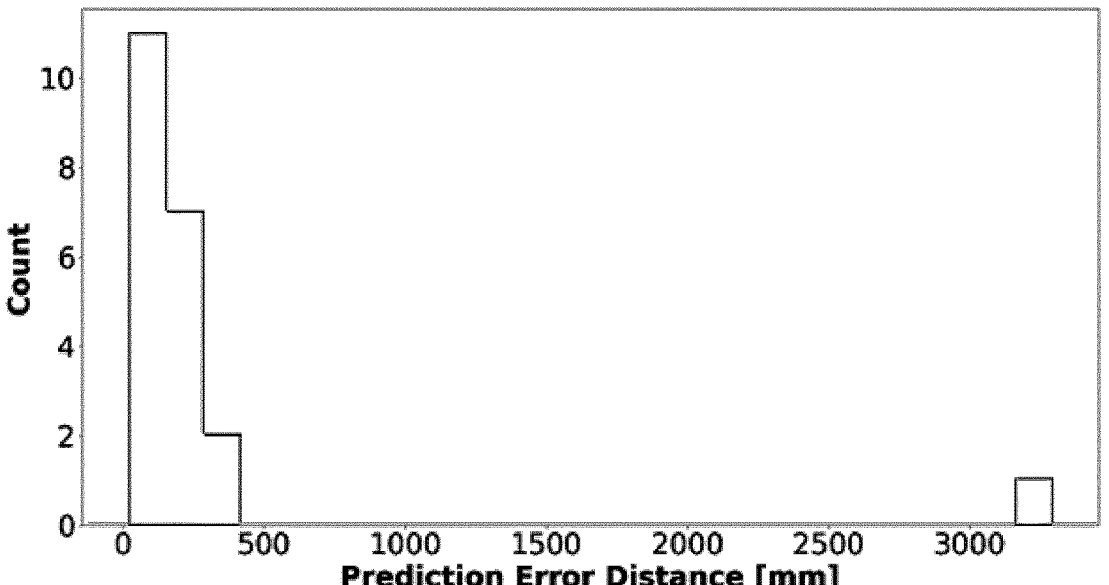
FIG. 21 shows a prediction error graph from testing an embodiment in a real-world setup.

FIG. 21 shows a prediction error graph from testing this embodiment in the real-world setup. Twenty of the twenty-one predicted device locations shown in FIG. 20 have an error distance of under 500 mm.

It was noted from the real-world testing that increasing the number of layers, the number of neurons per layer and the number of training data iterations, but decreasing the number of epochs, compared with the number above, yielded some further improvement.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A method of determining locations of devices, the method comprising:

receiving location data representative of a set of candidate locations in an environment;

generating training data comprising a plurality of training data sets, each training data set comprising data representing synthetic distance measurements between respective pairs of the candidate locations, wherein the synthetic distance measurements are determined by determining geometric distances between pairs of the candidate locations and applying random variations to the geometric distances;

using the training data and the location data to train a machine learning model that is arranged to receive a set of distance measurements as input and to generate data representative of a set of one or more locations as output;

receiving measurement data representative of a set of measured distance measurements between respective pairs of a plurality of devices in the environment;

inputting the set of measured distance measurements to the trained machine learning model; and determining, from the trained machine learning model, data representative of a respective location in the environment for each of the plurality of devices.

2. The method of claim 1, wherein each of the plurality of devices comprises a radio transceiver and the measurement data is generated from radio signals exchanged between pairs of the devices.

3. The method of claim 1, wherein each of the plurality of devices has a respective device-specific identifier and wherein the measurement data comprises data representative of the corresponding device-specific identifiers for each respective pair of devices.

4. The method of claim 1, wherein each of the candidate locations corresponds to an intended or current location of a respective one of the plurality of devices in the environment.

5. The method of claim 1, wherein the location data representative of the set of candidate locations does not identify the plurality of devices.

6. The method of claim 1, wherein the number of devices in the plurality of devices is the same as the number of candidate locations in the set of candidate locations.

7. The method of claim 1, wherein applying random variations to the calculated geometric distances comprises excluding one or more geometric distances from being used to generate the training data, based on a random variable.

8. The method of claim 1, wherein applying random variations to the calculated geometric distances comprises, for each of the geometric distances:

determining a respective first random number;

comparing the respective geometric distance with the respective first random number;

using the respective geometric distance for generating the training data if the geometric distance value is less than the respective first random number, and not using the respective geometric distance for generating the training data if the geometric distance value is more than the respective first random number.

9. The method of claim 1, wherein applying random variations to the calculated geometric distances comprises adjusting the value of one or more geometric distances based on a random variable.

10. The method of claim 8, wherein applying random variations to the geometric distances comprises, for each of the geometric distances:

determining a respective second random number; and modifying the respective geometric distance in dependence on the respective second random number.

11. The method of claim 1, wherein the machine learning model is a regression model.

12. The method of claim 1, further comprising determining or adjusting one or more parameters of the machine learning model in dependence on the received location data.

13. The method of claim 1, wherein each of the plurality of devices is static in the environment when the measurement data is obtained.

14. The method of claim 1, further comprising using the data representative of a respective location in the environment for each of the plurality of devices to assign some or all of the plurality of devices to respective locations from the set of candidate locations.

15. The method of claim 1, further comprising:

for each of the plurality of devices, identifying a closest candidate location of the set of candidate locations; and generating an alert in response to identifying a candidate
location as being the closest candidate location for two
or more devices.

16. Apparatus comprising a computer processing system
for determining locations of devices, the computer process-
ing system being configured to perform the method of claim
1.

17. The apparatus of claim 16, wherein the apparatus
further comprises said plurality of devices.

18. The apparatus of claim 16, wherein the computer
processing system comprises a wireless network interface
for communicating wirelessly with one or more of the
plurality of devices.

19. A non-transitory computer readable storage medium
storing instructions that, when executed by a processor,
cause the processor to perform the method of claim 1.

20. The non-transitory computer readable storage medium
of claim 19, storing instructions for implementing the
machine learning model.

* * * * *